United States Patent
Little

(10) Patent No.: US 11,563,364 B2
(45) Date of Patent: Jan. 24, 2023

(54) SHAFTLESS LINEAR RESONANT ACTUATOR WITH INTERFACE BETWEEN MAGNETS AND MASSES HAVING BLIND HOLES FOR GLUE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 96 days.

(21) Appl. No.: 17/013,662

(22) Filed: Sep. 7, 2020

(65) Prior Publication Data

US 2021/0075306 A1 Mar. 11, 2021

Related U.S. Application Data

(60) Provisional application No. 62/899,156, filed on Sep. 12, 2019, provisional application No. 62/896,547, filed on Sep. 5, 2019.

(51) Int. Cl.
*H02K 33/00* (2006.01)
*H02K 33/02* (2006.01)

(52) U.S. Cl.
CPC .................................. *H02K 33/02* (2013.01)

(58) Field of Classification Search
CPC ........ H02K 33/02; H02K 33/00; H02K 33/16; H02K 35/02; H02K 7/1869; H02K 7/1876; H02K 7/1892; B06B 1/045
USPC ........ 310/25, 15, 12.01, 81, 80, 321, 20, 21, 310/28–30, 36–37, 40 MM
See application file for complete search history.

(56) References Cited

U.S. PATENT DOCUMENTS

| 6,323,568 | B1 * | 11/2001 | Zabar | H02K 33/04 310/12.24 |
|---|---|---|---|---|
| 7,671,493 | B2 * | 3/2010 | Takashima | G06F 3/016 310/15 |
| 8,278,786 | B2 * | 10/2012 | Woo | H02K 33/16 310/15 |
| 8,368,268 | B2 * | 2/2013 | Hasegawa | G02B 21/248 359/381 |

(Continued)

*Primary Examiner* — Maged M Almawri
(74) *Attorney, Agent, or Firm* — Ming Chieh Chang

(57) ABSTRACT

An LRA with a magnet assembly sandwiched between a pair of moving masses or support blocks which are further sandwiched between a pair of springs. A stationary elongated shaft extends through both the magnet assembly and the pair of moving masses and the pair of springs with two opposite ends secured to the corresponding end walls of the case in which all the magnet assembly, the pair of moving masses and the springs are disclosed. The moving mass forms a pair of recesses in opposite top and bottom surfaces. The case forms a pair of protrusions on opposite top and bottom walls to respectively received within the corresponding recesses so as to provide the reliable support upon the moving mass in a vertical direction. Each moving mass forms a protrusion to hold the corresponding spring in position.

7 Claims, 37 Drawing Sheets

(56) References Cited

U.S. PATENT DOCUMENTS

| | | | |
|---|---|---|---|
| 8,648,502 B2 * | 2/2014 | Park | H02K 33/16 |
| | | | 310/15 |
| 8,941,272 B2 * | 1/2015 | Hong | H02K 33/18 |
| | | | 310/15 |
| 9,024,489 B2 * | 5/2015 | Akanuma | H02K 33/16 |
| | | | 310/15 |
| 9,225,265 B2 * | 12/2015 | Oh | H02N 2/001 |
| 9,306,429 B2 * | 4/2016 | Akanuma | H02K 33/16 |
| 9,543,816 B2 * | 1/2017 | Nakamura | H02K 33/16 |
| 9,748,827 B2 * | 8/2017 | Dong | H02K 33/16 |
| 9,906,109 B2 * | 2/2018 | Endo | H02K 33/16 |
| 9,948,170 B2 * | 4/2018 | Jun | H02K 33/00 |
| 10,008,894 B2 * | 6/2018 | Mao | H02K 1/34 |
| 10,033,257 B2 * | 7/2018 | Zhang | H02K 33/12 |
| 10,063,128 B2 * | 8/2018 | Wang | H02K 33/16 |
| 10,160,010 B2 * | 12/2018 | Chun | H02K 33/16 |
| 10,307,791 B2 * | 6/2019 | Xu | B06B 1/045 |
| 10,328,461 B2 * | 6/2019 | Xu | B06B 1/045 |
| 10,447,133 B2 * | 10/2019 | Jin | H02K 33/18 |
| 10,483,451 B2 * | 11/2019 | Wang | H01L 41/09 |
| 10,486,196 B2 * | 11/2019 | Chai | B06B 1/045 |
| 10,491,090 B2 * | 11/2019 | Zu | H02K 33/16 |
| 10,547,233 B2 * | 1/2020 | Jin | H02K 5/04 |
| 10,596,596 B2 * | 3/2020 | Ling | B06B 1/045 |
| 10,674,278 B2 * | 6/2020 | Zhou | H04R 9/025 |
| 10,763,732 B2 * | 9/2020 | Liu | H02K 33/18 |
| 10,886,827 B2 * | 1/2021 | Liu | H02K 33/14 |
| 11,050,334 B2 * | 6/2021 | Mori | H02K 33/18 |
| 11,309,808 B1 * | 4/2022 | Li | H02K 35/02 |
| 2009/0267423 A1 * | 10/2009 | Kajiwara | H02K 33/02 |
| | | | 310/38 |
| 2010/0213773 A1 * | 8/2010 | Dong | H02K 33/16 |
| | | | 310/25 |
| 2011/0018364 A1 * | 1/2011 | Kim | H02K 33/18 |
| | | | 310/20 |
| 2011/0068640 A1 * | 3/2011 | Choi | H02K 5/04 |
| | | | 310/25 |
| 2011/0089772 A1 * | 4/2011 | Dong | H02K 33/16 |
| | | | 310/25 |
| 2011/0115311 A1 * | 5/2011 | Dong | H02K 33/16 |
| | | | 310/28 |
| 2011/0133577 A1 * | 6/2011 | Lee | H02K 33/18 |
| | | | 310/15 |
| 2011/0316361 A1 * | 12/2011 | Park | H02K 33/16 |
| | | | 310/25 |
| 2012/0153748 A1 * | 6/2012 | Wauke | H02K 33/16 |
| | | | 310/25 |
| 2012/0187780 A1 * | 7/2012 | Bang | H02K 33/16 |
| | | | 310/25 |
| 2012/0313459 A1 * | 12/2012 | Zhang | H02K 33/18 |
| | | | 310/25 |
| 2013/0099600 A1 * | 4/2013 | Park | B06B 1/045 |
| | | | 310/15 |
| 2013/0169071 A1 | 7/2013 | Endo et al. | |
| 2014/0035397 A1 * | 2/2014 | Endo | H02K 33/18 |
| | | | 310/30 |
| 2015/0137628 A1 * | 5/2015 | Endo | H02K 33/16 |
| | | | 310/25 |
| 2016/0164389 A1 * | 6/2016 | Jang | H02K 7/116 |
| | | | 310/20 |
| 2016/0173990 A1 * | 6/2016 | Park | H04R 9/043 |
| | | | 381/354 |
| 2017/0033657 A1 * | 2/2017 | Mao | H02K 33/16 |
| 2017/0110920 A1 * | 4/2017 | Mao | H02K 1/34 |
| 2017/0288519 A1 * | 10/2017 | Kim | H02K 33/00 |
| 2018/0021812 A1 * | 1/2018 | Akanuma | H02K 33/00 |
| | | | 310/25 |
| 2018/0250107 A1 * | 9/2018 | Dai | A61C 17/221 |
| 2019/0044425 A1 * | 2/2019 | Zu | H02K 33/18 |
| 2019/0151895 A1 * | 5/2019 | Takahashi | H02K 33/18 |

\* cited by examiner

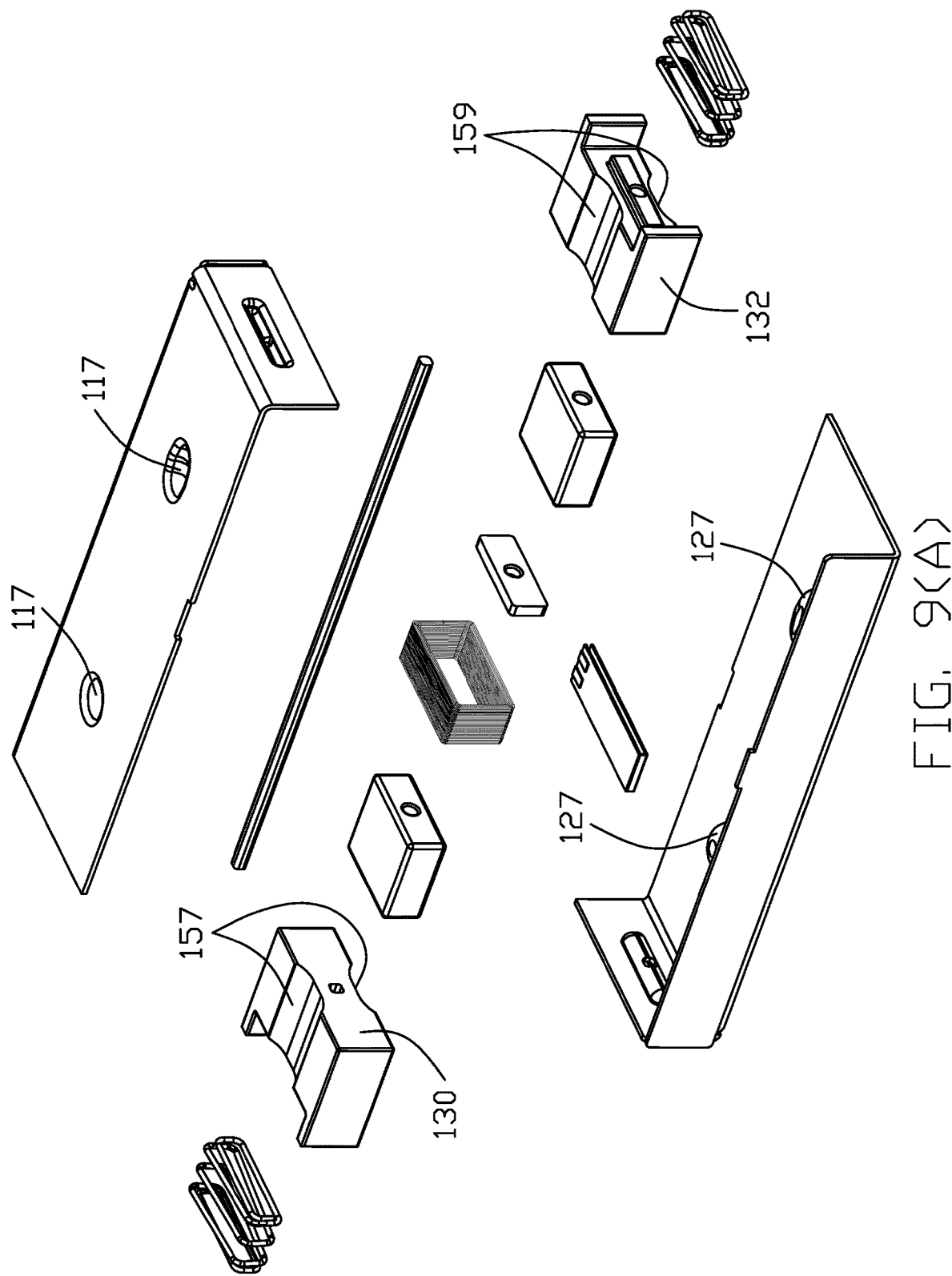

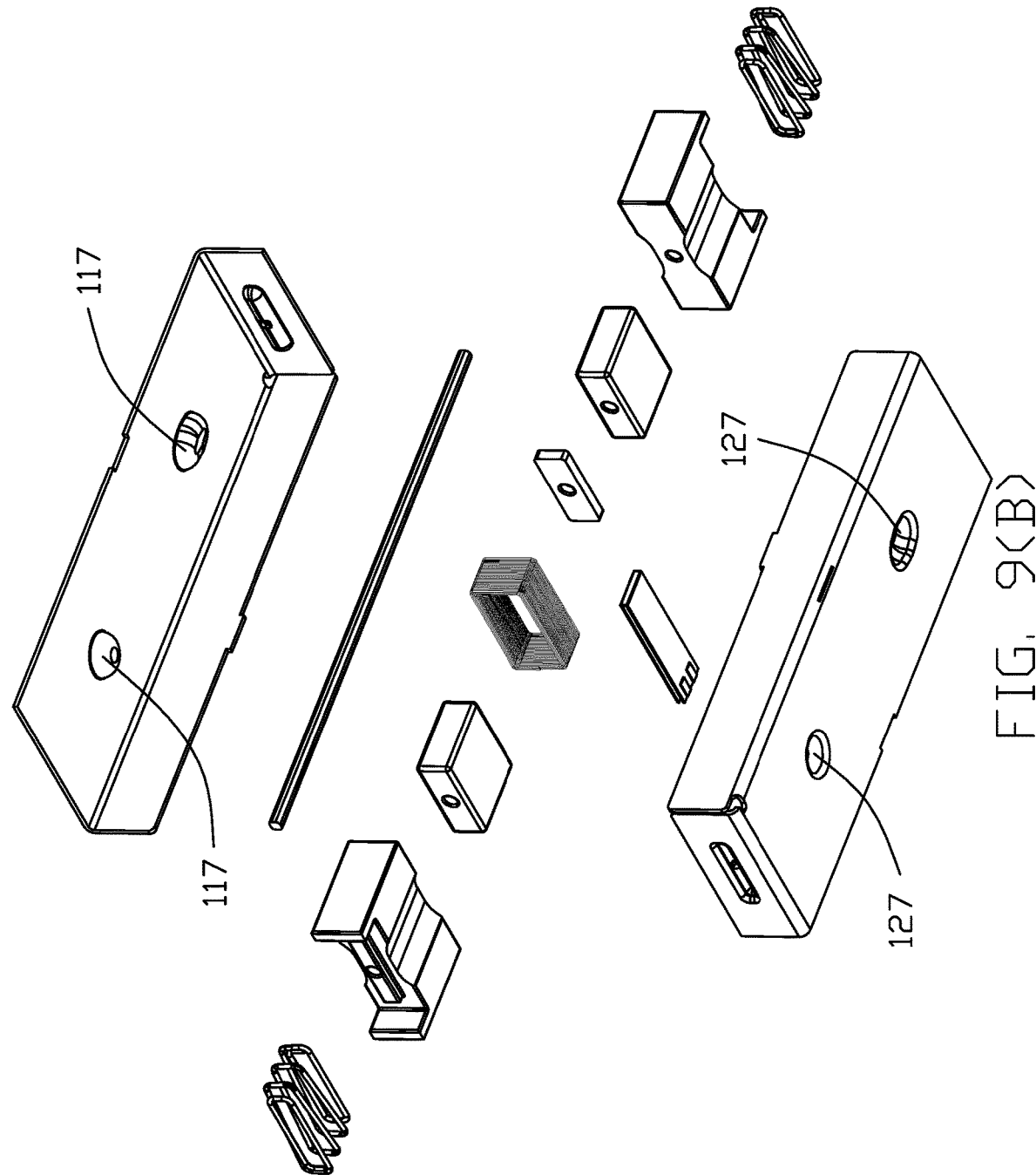

200

US 11,563,364 B2

SHAFTLESS LINEAR RESONANT ACTUATOR WITH INTERFACE BETWEEN MAGNETS AND MASSES HAVING BLIND HOLES FOR GLUE

BACKGROUND OF THE INVENTION

1. Field of the Invention

The present invention relates generally to a linear resonant actuator (LRA), and particularly to the LRA operable stably and reliably.

2. Description of Related Arts

The LRA as shown in US 2013/0169071, is popularly used in the cellular phone. Anyhow, a reliable and easy assembling of the LRA is desired.

SUMMARY OF THE INVENTION

An object of the invention is to provide an LRA with a magnet assembly sandwiched between a pair of moving masses or support blocks which are further sandwiched between a pair of springs. A stationary elongated shaft extends through both the magnet assembly and the pair of moving masses and the pair of springs with two opposite ends secured to the corresponding end walls of the case in which all the magnet assembly, the pair of moving masses and the springs are disclosed. The shaft forms a square cross-section while the corresponding through holes in the magnet assembly and the moving masses are circular. The moving mass forms a pair of recesses in opposite top and bottom surfaces. The case forms a pair of protrusions on opposite top and bottom walls to respectively received within the corresponding recesses so as to provide the reliable support upon the moving mass in a vertical direction. Each moving mass forms a protrusion to hold the corresponding spring in position. In an alternate embodiment, the shaft may be terminated at the moving masses to be moveable along with the magnet assembly. Another object of the invention is to provide an LRA with a magnet assembly sandwiched between a pair of moving masses or support blocks which are further sandwiched between a pair of springs. No elongated shaft for alignment extends through the magnet assembly or the pair of moving masses. Instead, the magnet assembly is not only self-assembled by glue but also further assembled with the corresponding masses by glue. A blind hole is formed in the corresponding mass to accommodate the excessive glue for no contamination.

BRIEF DESCRIPTION OF THE DRAWING

FIG. 9(A) is a further exploded perspective view of the LRA of FIG. 8(A)

FIG. 9(B) is another exploded perspective view of the LRA of FIG. 9(A);

DETAILED DESCRIPTION OF THE PREFERRED EMBODIMENT

Figure 1A:
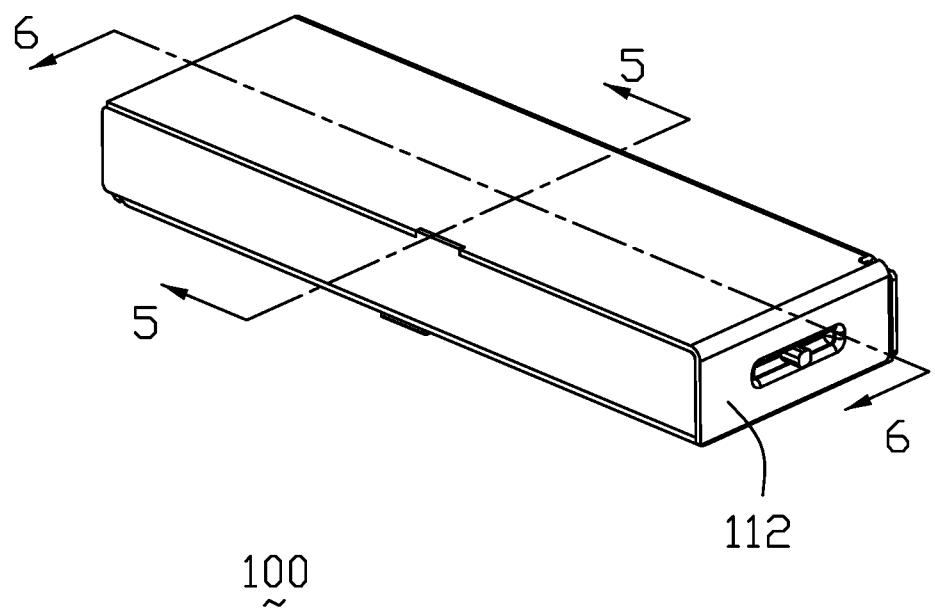
FIG. 1(A) is a perspective view of an LRA (Linear Resonant Actuator) according to a first embodiment of the invention.
Figure 1B:
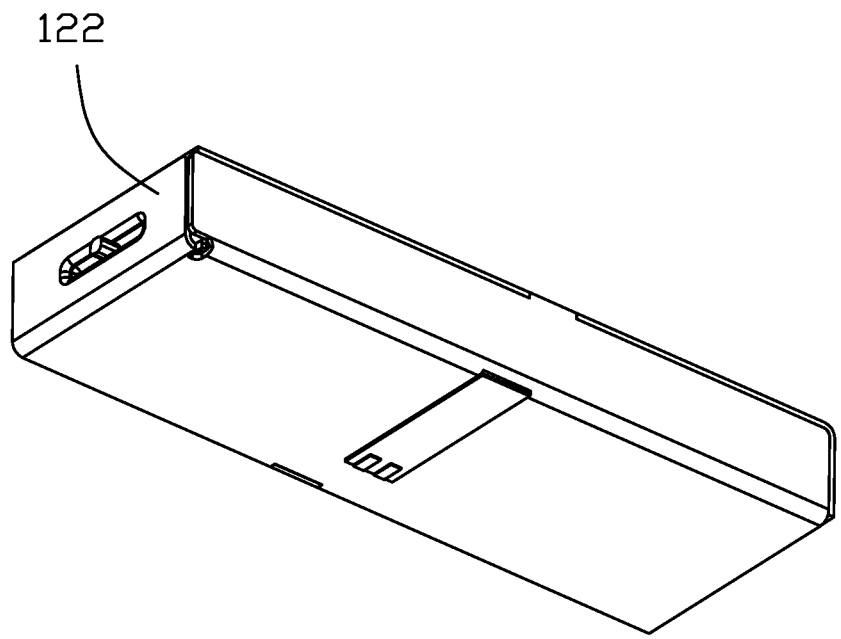
FIG. 1(B) is another perspective view of the LRA of FIG. 1(A)
Figure 2:
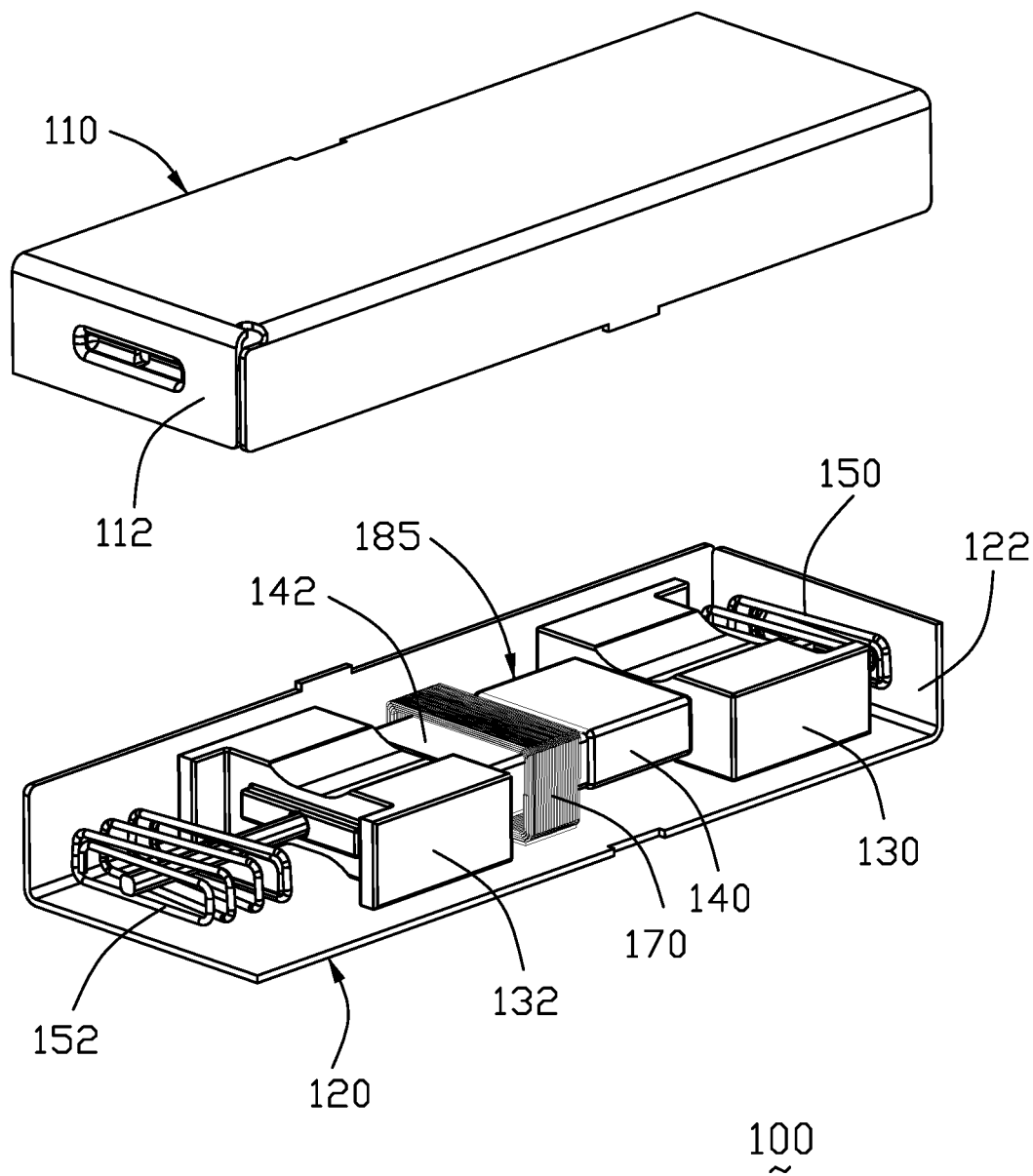
FIG. 2 is an exploded perspective view of the LRA of FIG. 1(A)
Figure 2A:
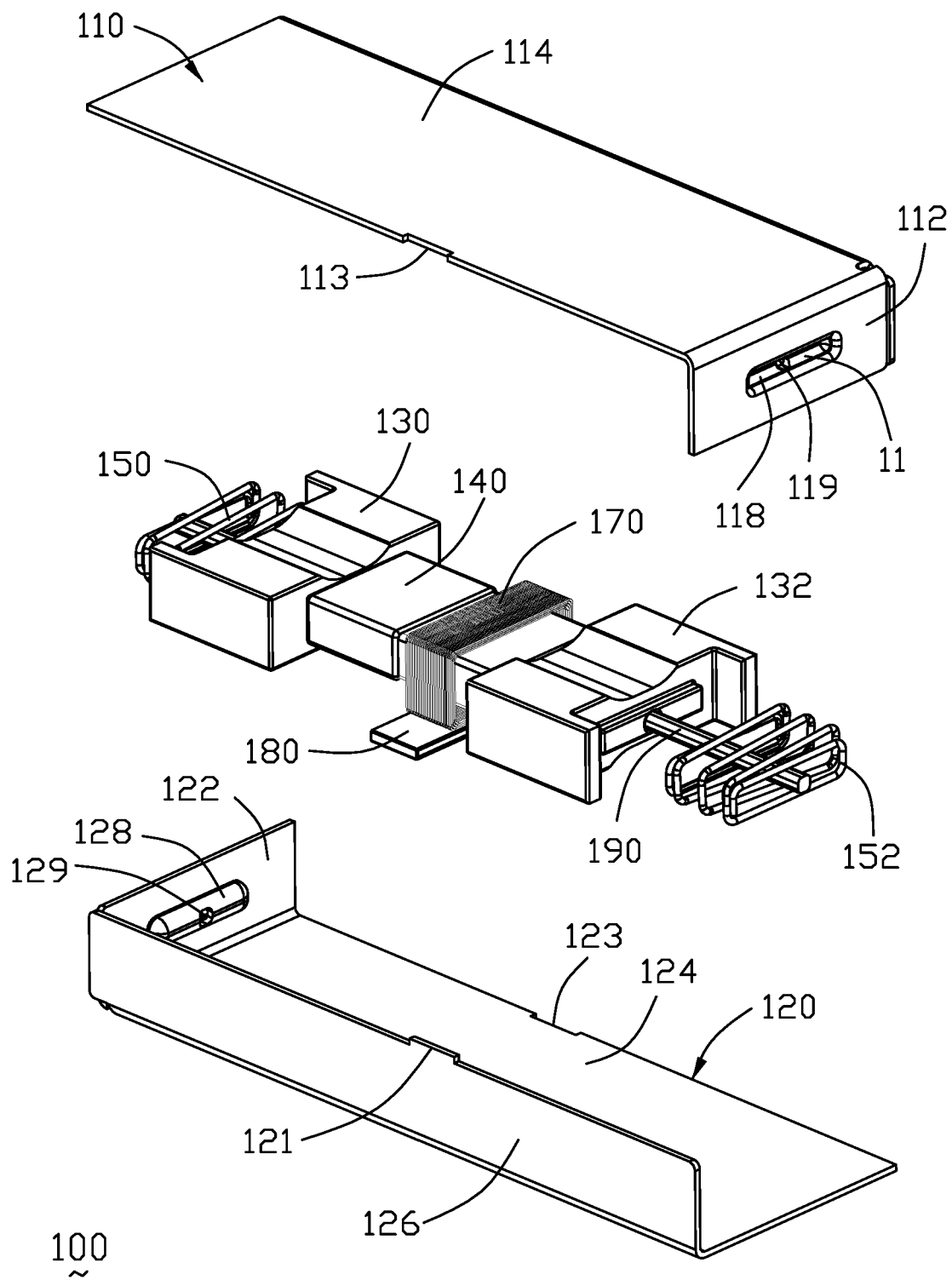
FIG. 2(A) is a further exploded perspective view of the LRA of FIG. 2.
Figure 2B:
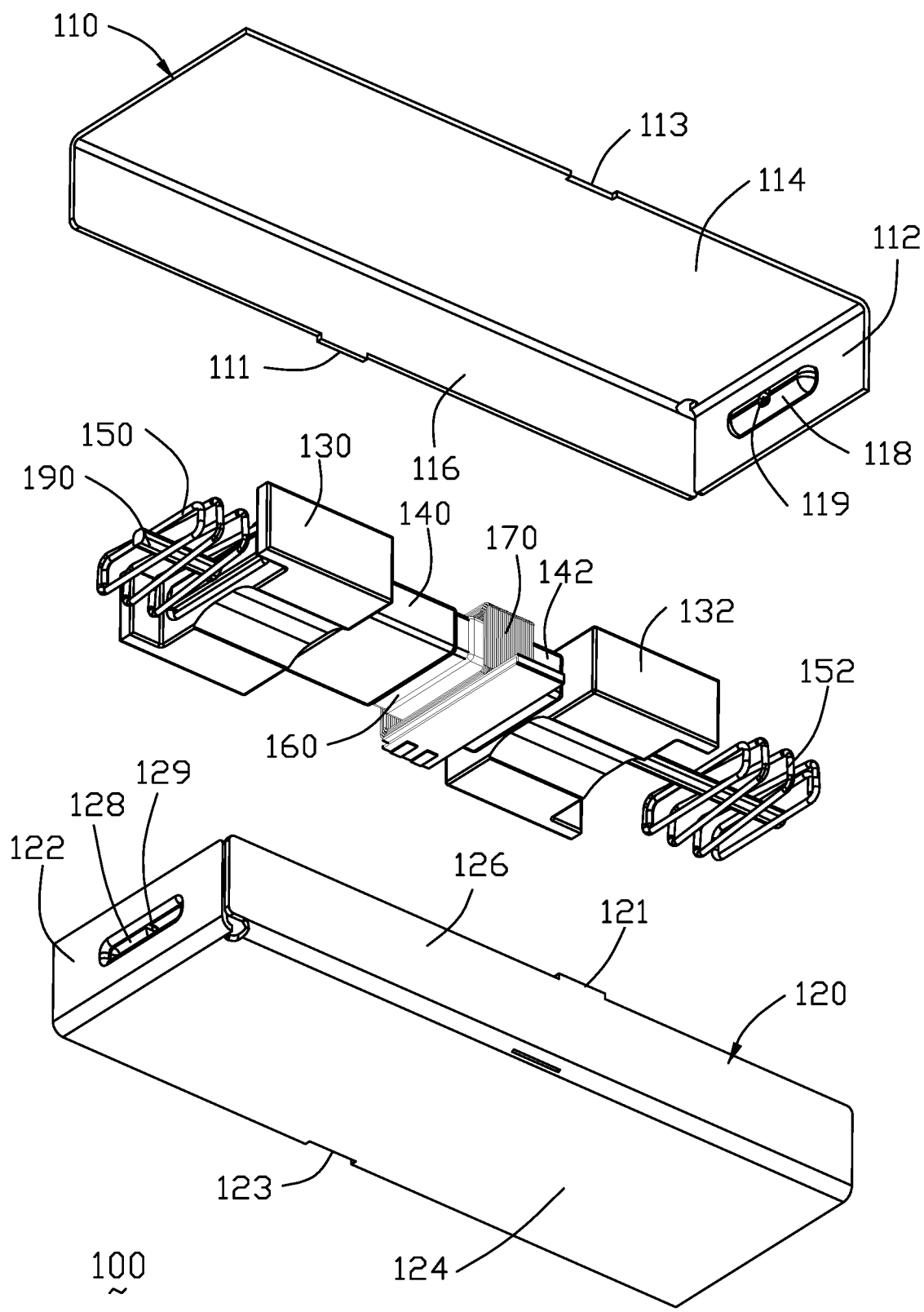
FIG. 2(B) is another exploded view of the electrical assembly of FIG. 2(A)
Figure 3A:
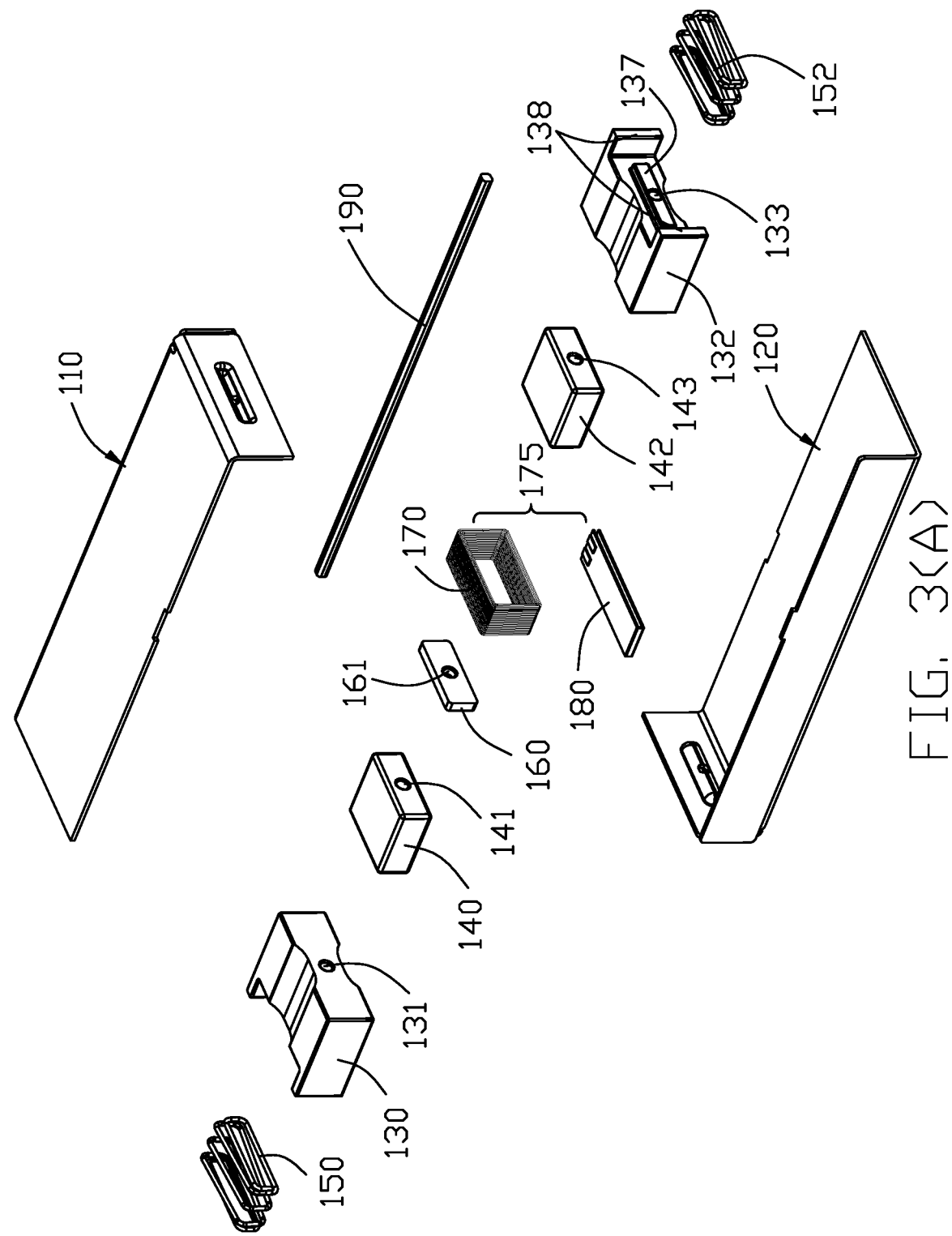
FIG. 3(A) is a further exploded perspective view of the LRA of FIG. 2(A)
Figure 3B:
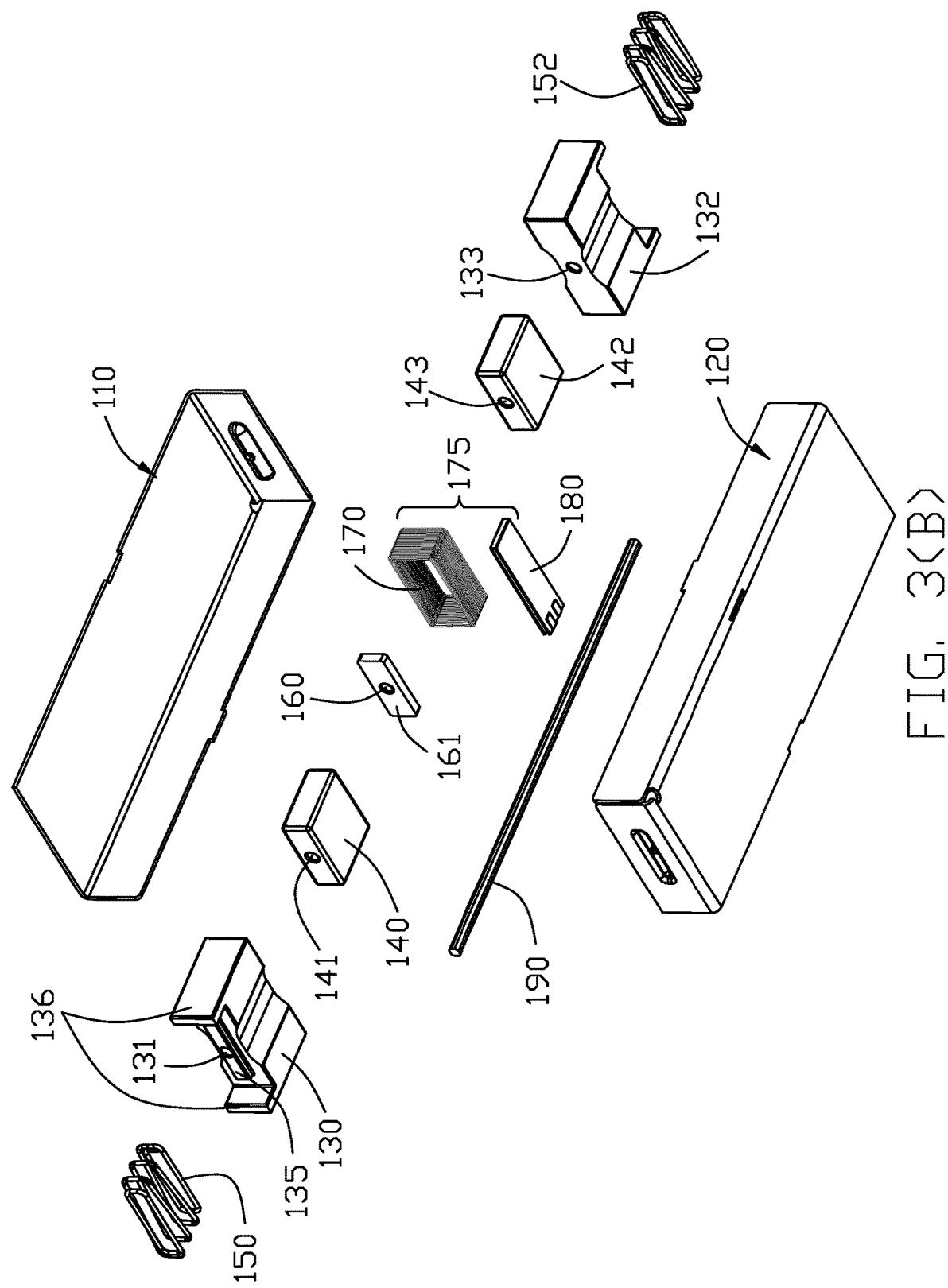
FIG. 3(B) is another exploded perspective view of the LRA of FIG. 5(A)
Figure 4:
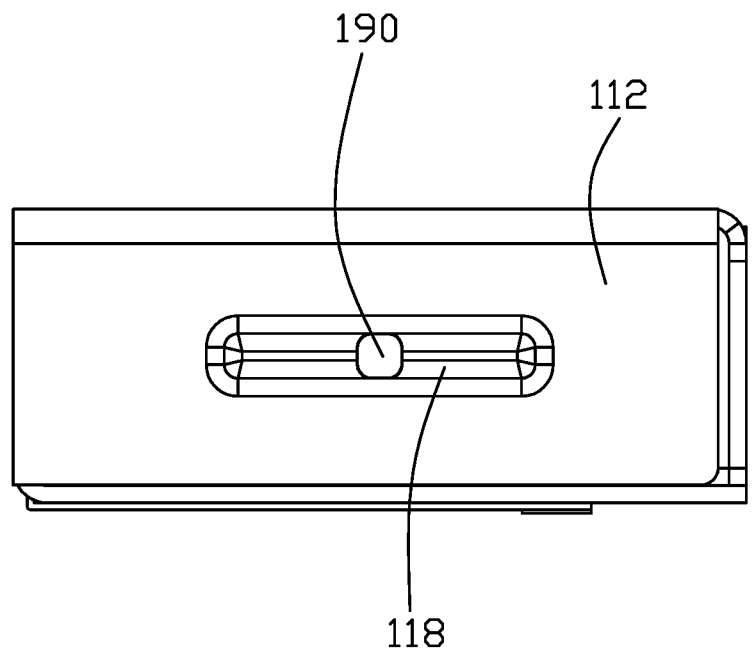
FIG. 4 is a side view of the LRA of FIG. 1(A)
Figure 5:
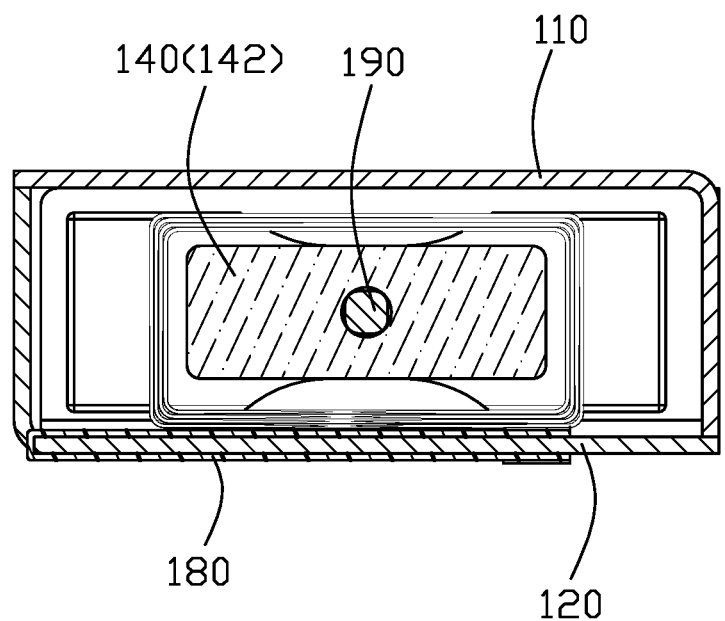
FIG. 5 is a cross-sectional view of the LRA of FIG. 1(A) along line 5-5.
Figure 6:
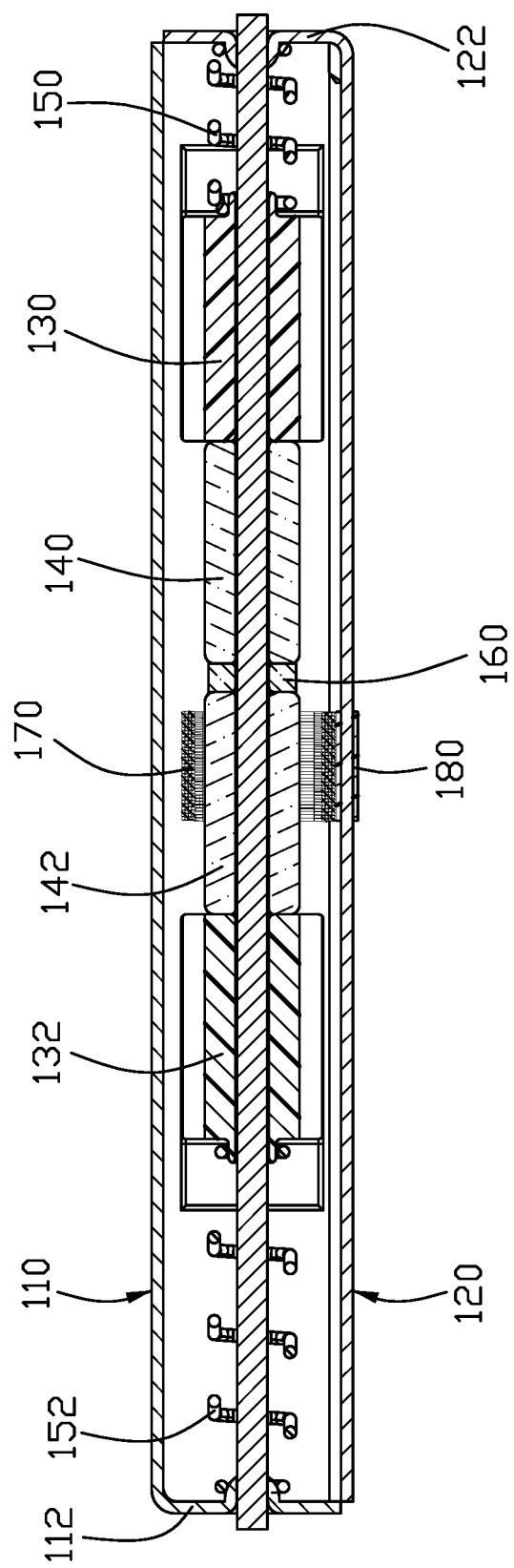
FIG. 6 is a cross-sectional view of the LRA of FIG. 1(A) along line 6-6.

Referring to FIG. 1(A)-6, an LRA 100 includes a metallic case composed of a first half 110 and a second half 120 essentially symmetrical with each other and welded together along the corresponding edges. The first half 110 has a horizontal plate 114, a long side wall 116 and a short side wall 112. The second half 120 has horizontal plate 124, a long side wall 126 and a short side wall 122. The short side wall 112 forms a linear inward embossment 118 with a round hole 119 extending therethrough along a longitudinal direction. The short side wall 122 forms a linear inward embossment 128 with a square hole 129 extending therethrough in the longitudinal direction. The horizontal plate 114 forms a notch 113 to receive a tab 121 extending from the long side wall 126, and the horizontal plate 124 forms another notch 123 to receive the corresponding tab 111 extending from the long side wall 116.

Inside the case, a magnet assembly 185 includes a first magnet 140 and a second magnet 142 cooperatively sandwiching therebetween along the longitudinal direction a middle magnetizer 160 which has high magnetic permeability and low coercive force compared with the first magnet 140 and the second magnet 142. The first magnet 140 has at the center a round through hole 141 along the longitudinal direction, and the second magnet 142 has at the center another around through hole 143 along the longitudinal direction. The middle magnetizer 160 has at the center a round through hole 161. A first moving mass or support block 130 and a second moving mass or support block 132 cooperatively sandwich the magnet assembly 185 therebetween along the longitudinal direction. The first moving mass 130 has at the center a round through hole 131, and the second moving mass 132 has at the center another round through hole 133. A first rectangular spring 150 is mounted upon the inward embossment 128 while a second rectangular spring 152 is mounted upon the inward embossment 118 whereby the pair of moving masses 130, 132 with the associated magnet assembly 185 therebetween are commonly sandwiched between the pair of rectangular springs 150, 153 tensionally along the longitudinal direction.

A movable center axle 190 having a square cross-section, extends through the corresponding through holes 141, 143, 161 of the magnet assembly 185 including the pair of magnet 140, 142 with the middle magnetizer 160 therebetween, the corresponding through holes 131, 133 of a pair of moving masses 130, 132, the pair of rectangular springs 150, 152 and terminates, by laser welding, at the corresponding through holes 129, 119 of the embossments 122, 112. Notably, to efficiently receive the corresponding end of the rectangular spring 150, the moving mass 130 forms a protrusion 135 between two spaced plates 136. Similarly, the moving mass 132 forms a protrusion 137 between two spaced plates 1 to receive the corresponding end of the rectangular spring 152. In this embodiment, four corners of the square cross-section of the center axle 190 is curved or rounded so as to facilitate smooth translation of the moving mass 130, 132 and the magnet assembly 185 relative thereto. The through hole of the moving mass may be the square with the rounded corners to comply with the center axel. A coil assembly 175 includes a conductive coil 170 and an FPC (Flexible Printed Circuit) 180 connected to each other wherein the coil 170 is located inside the case to surround the magnet assembly 185 with gaps therebetween while the FPC 180 extends outside of the case for power supply.

Understandably, when the coil assembly 175 is operated, the magnet assembly 175 along with the pair of moving masses 130, 132 will be oscillated between the pair of springs 150, 152, along the longitudinal or axial direction, thus resulting in haptic vibration.

Figure 7A:
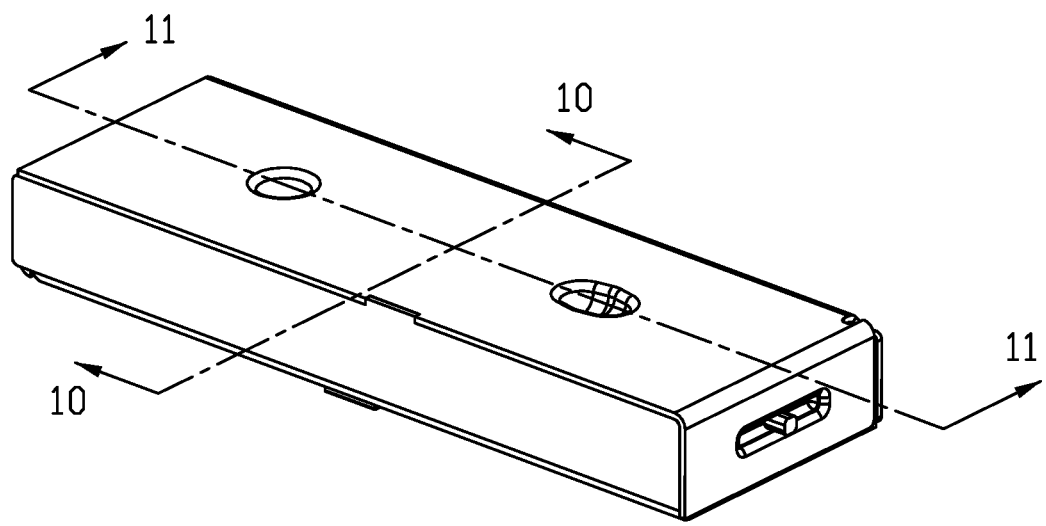
FIG. 7(A) is a perspective view of an LRA according to a second embodiment of the invention.
Figure 7B:
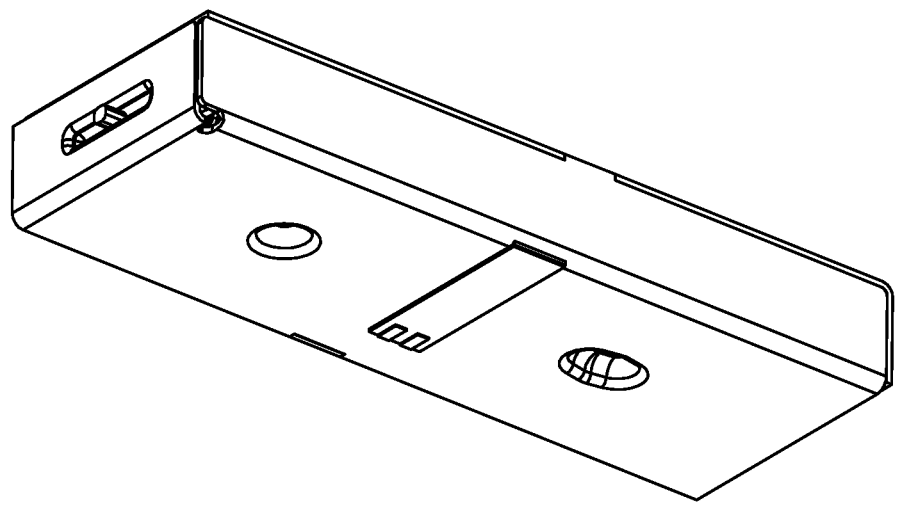
FIG. 7(B) is another perspective view of the LRA of FIG. 7(A)
Figure 8:
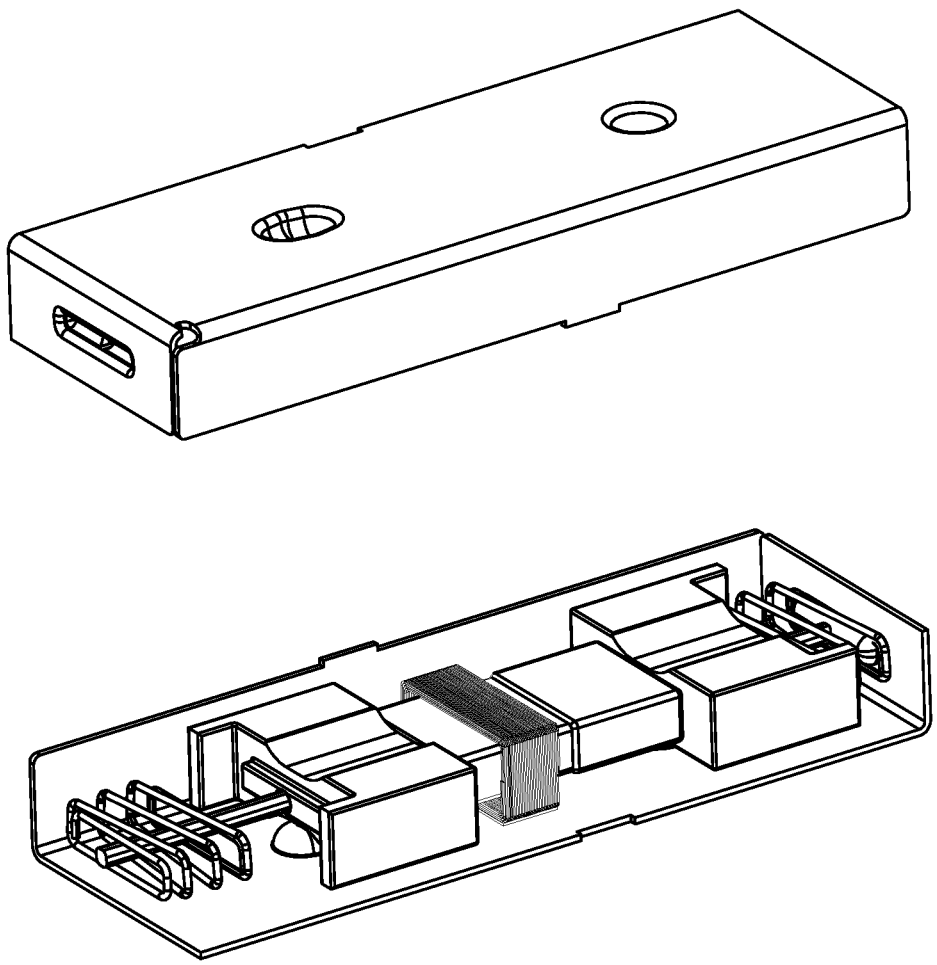
FIG. 8 is an exploded perspective view of the LRA of FIG. 7(A)
Figure 8A:
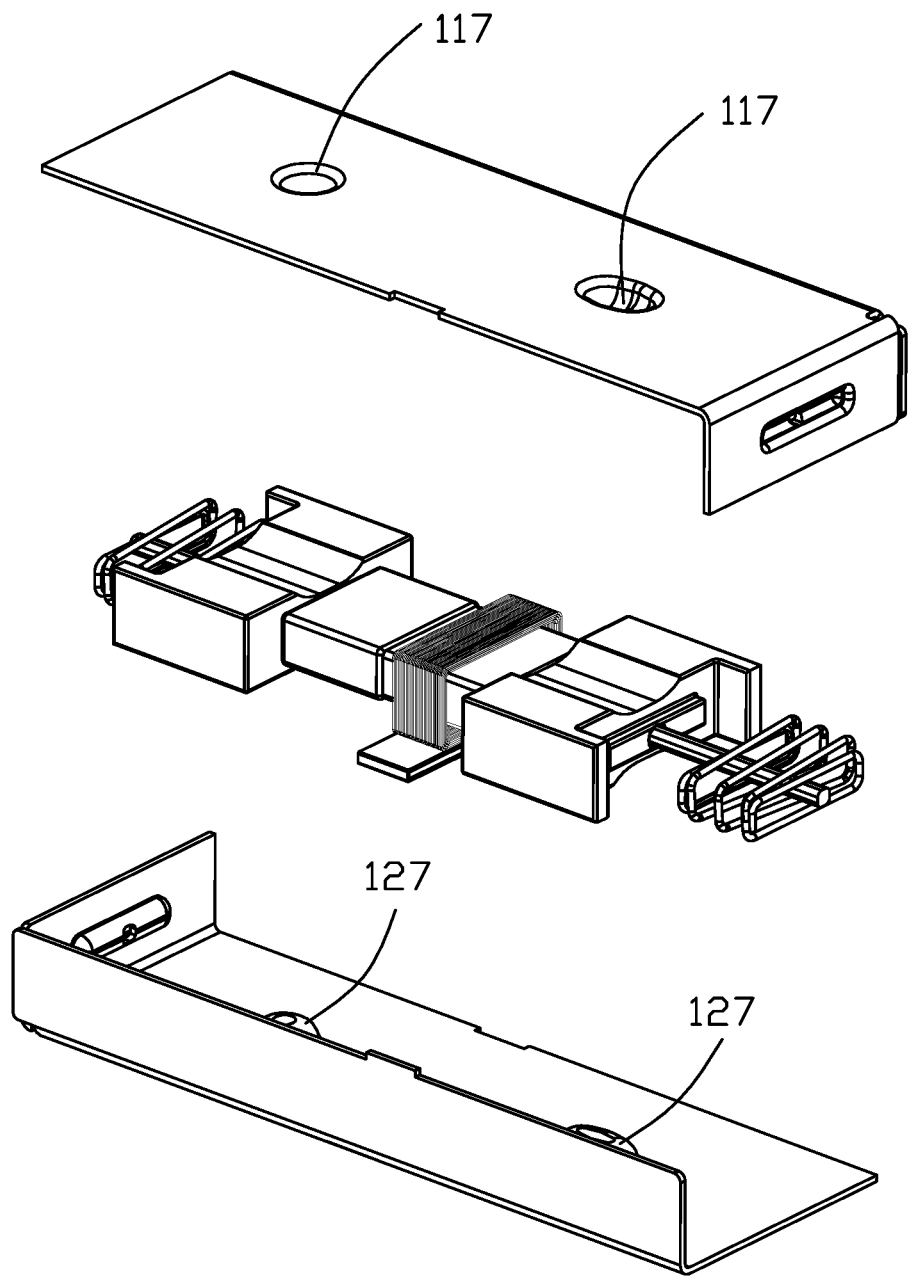
FIG. 8(A) is a further exploded perspective view of the LRA of FIG. 8.
Figure 8B:
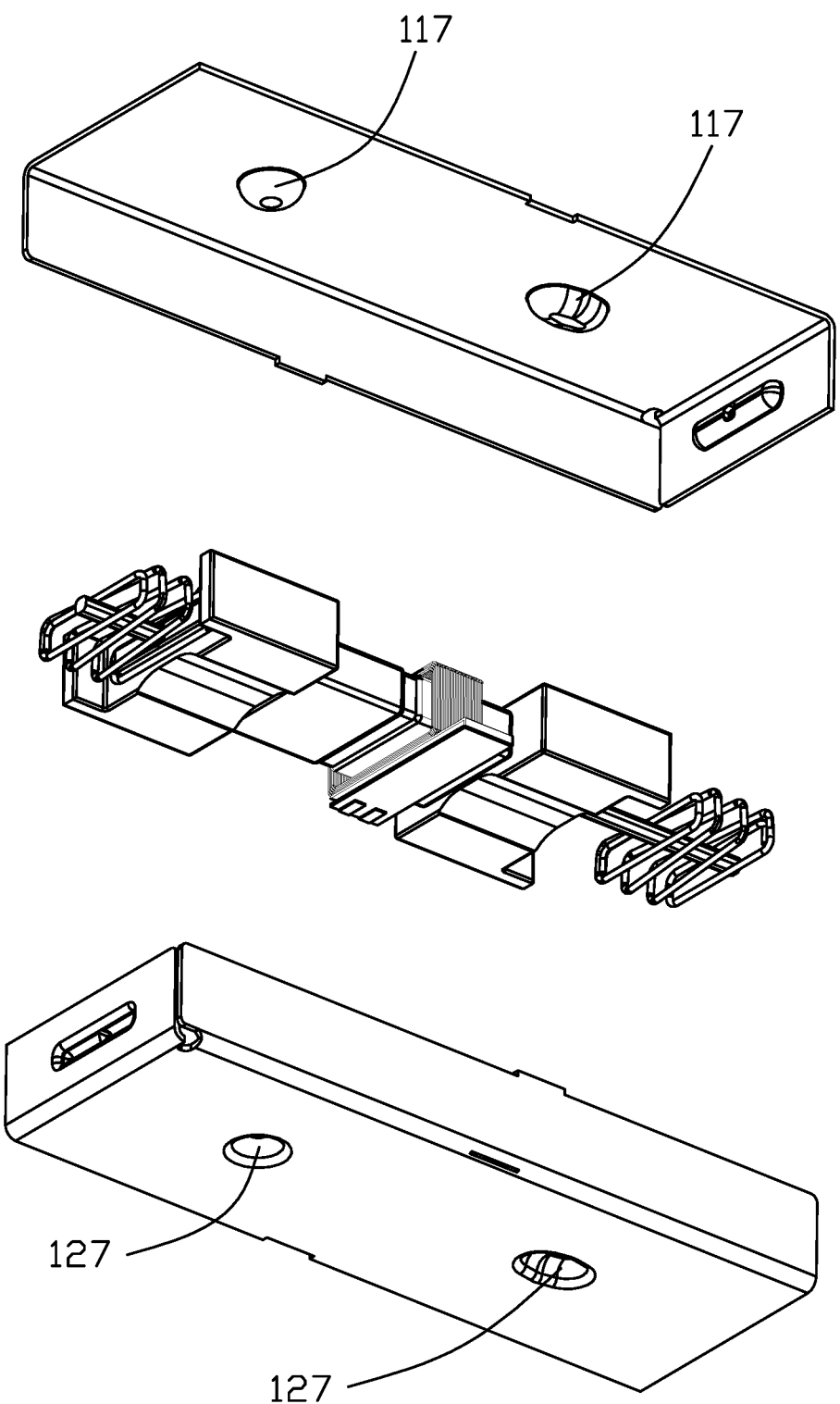
FIG. 8(B) is another exploded view of the electrical assembly of FIG. 8(A)
Figure 10:
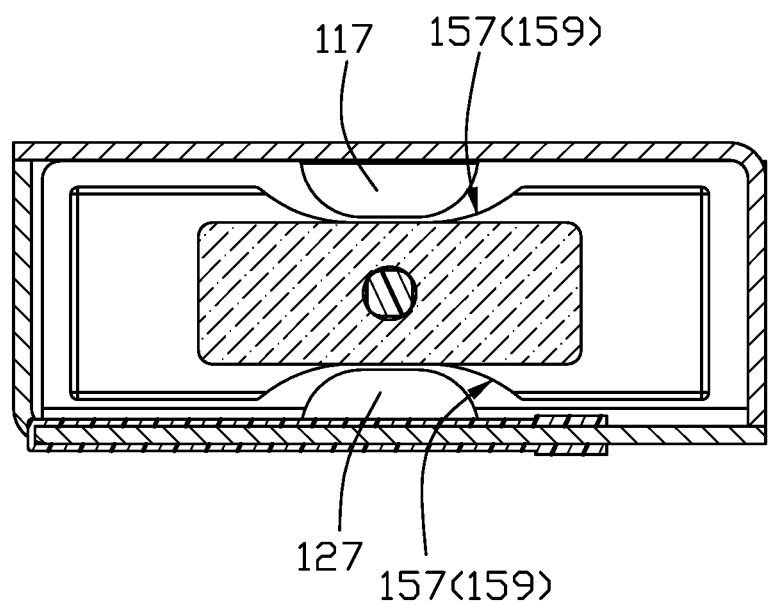
FIG. 10 is a cross-sectional view of the LRA of FIG. 7(A) along line 10-10.
Figure 11:
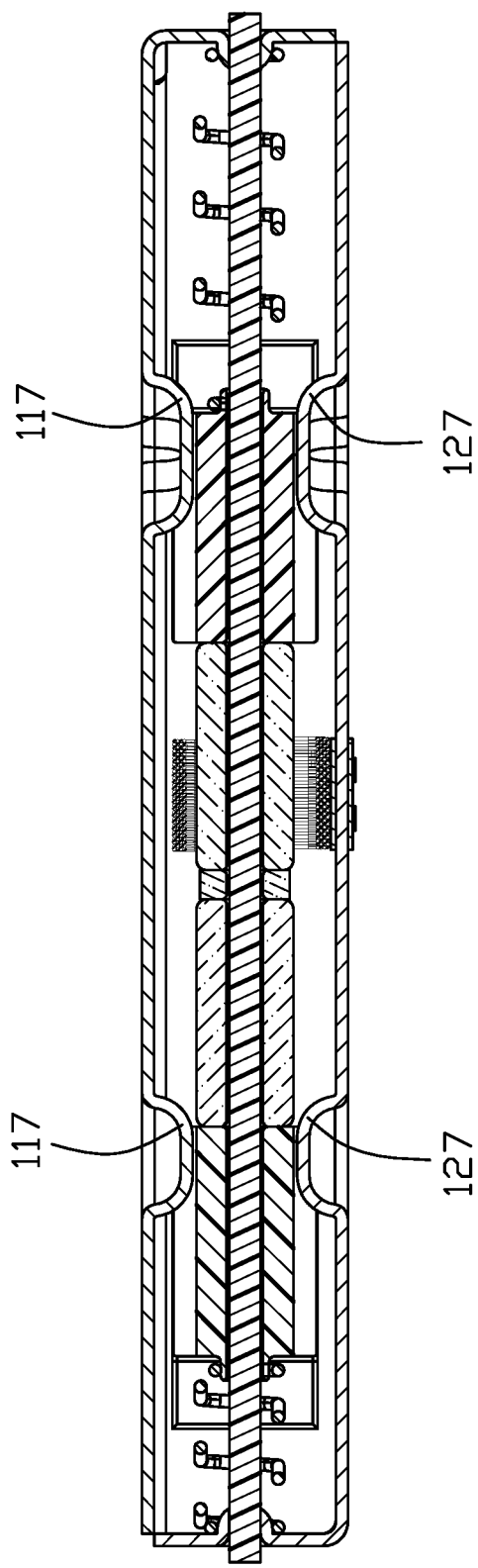
FIG. 11 is a cross-sectional view of the LRA of FIG. 7(A) along line 11-11.

FIGS. 7(A)-11 show a second embodiment which is similar to the first embodiment except the case further forms inward protrusions 117 on the horizontal plates 114 and the inward protrusions 127 on the horizontal plate 124 in a vertical direction to be received within the corresponding grooves 157 in the moving mass 130 and the corresponding grooves 150 in the moving mass 132 with gaps so as to guide linear movement of the moving masses 130, 132 to stabilize the whole oscillation of the magnet assembly 185 and the moving masses 130, 132 between the pair of springs 150, 152. Notably, both the first embodiment and the second embodiment show the stationary center shaft/axle 190 along which the magnet assembly 185 and the moving masses 130, 132 are moveable.

Figure 12A:
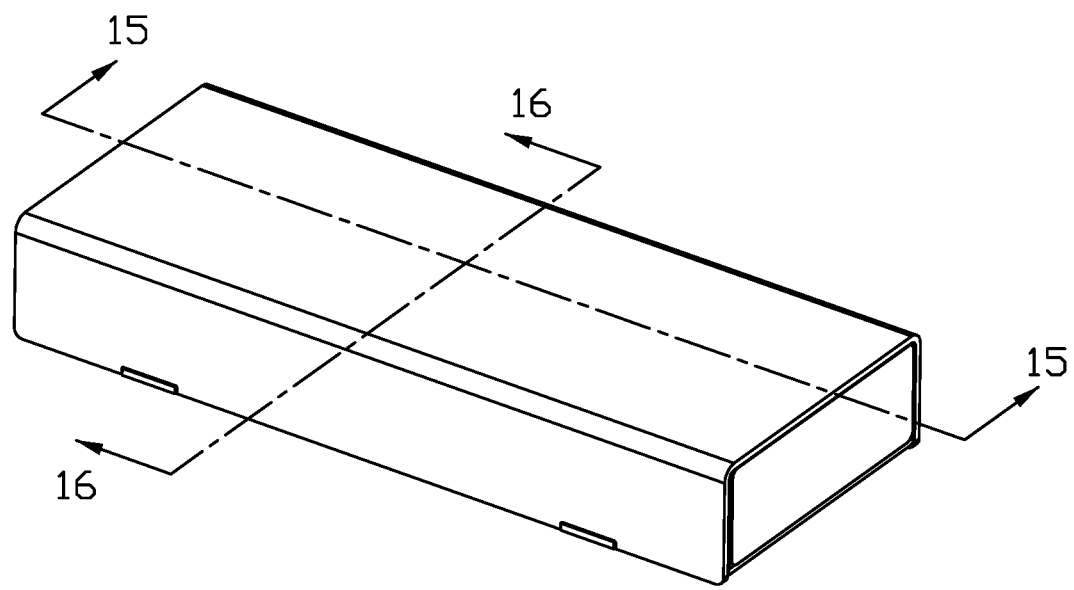
FIG. 12A) is a perspective view of an LRA according to a third embodiment of the invention.
Figure 12B:
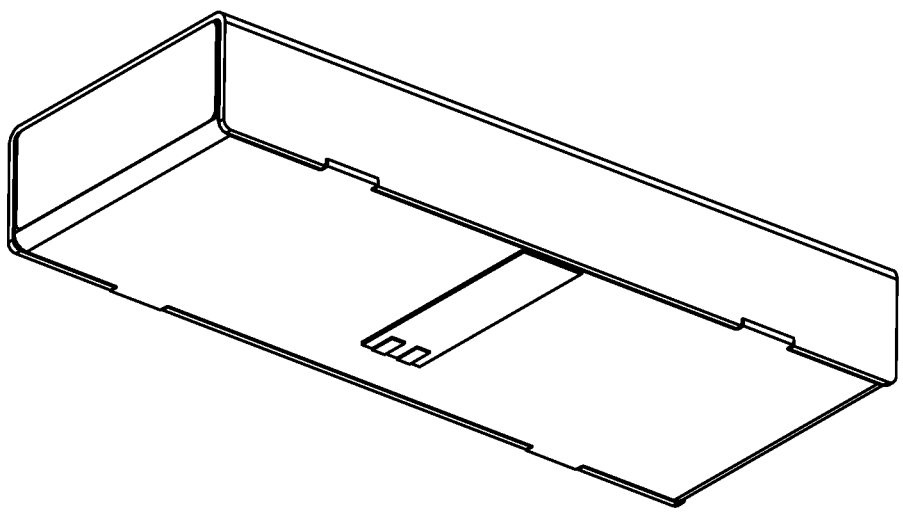
FIG. 12(B) is another perspective view of the LRA of FIG. 12(A)
Figure 13:
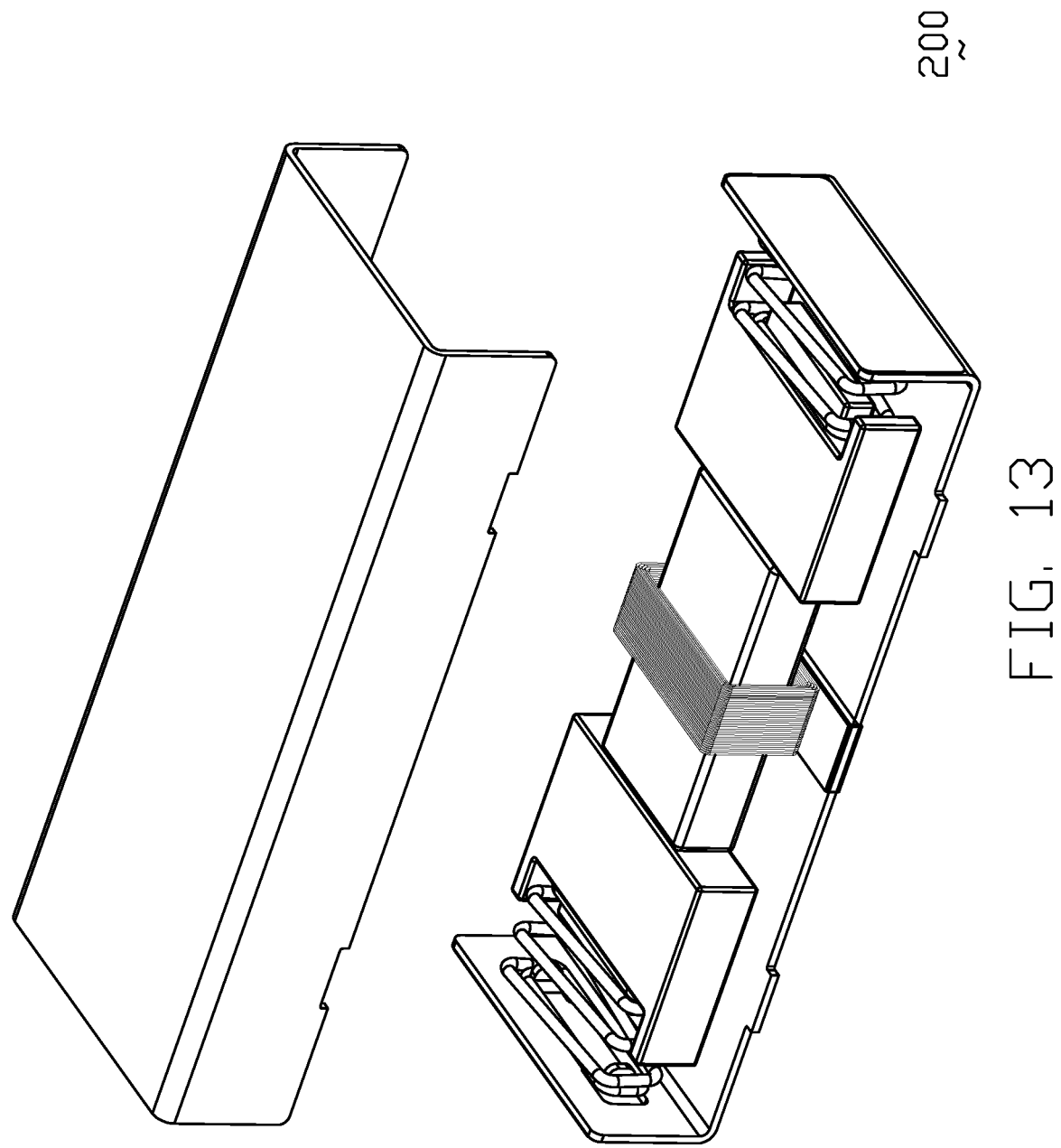
FIG. 13 is an exploded perspective view of the LRA of FIG. 12(A)
Figure 13A:
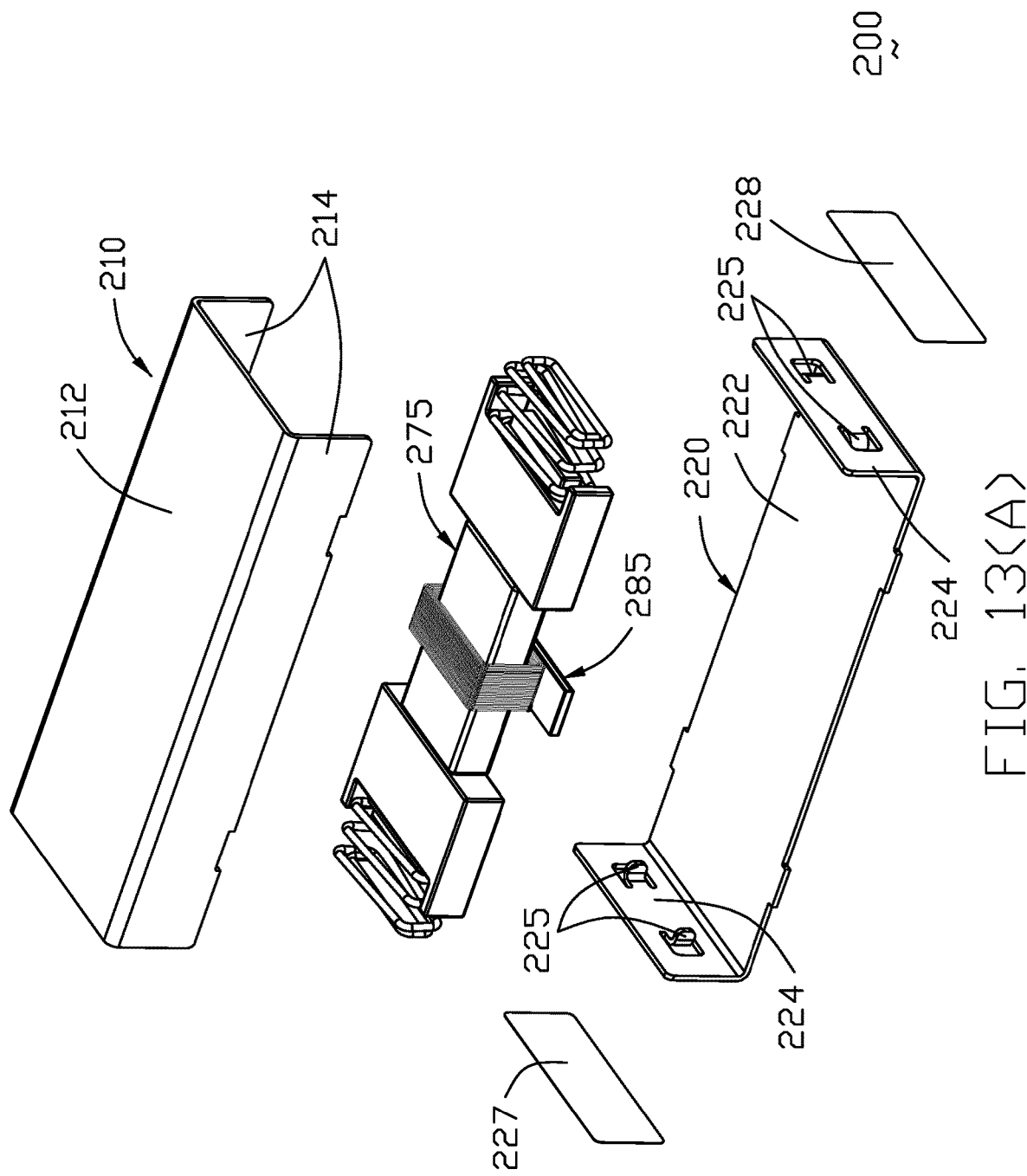
FIG. 13(A) is a further exploded perspective view of the LRA of FIG. 13.
Figure 13B:
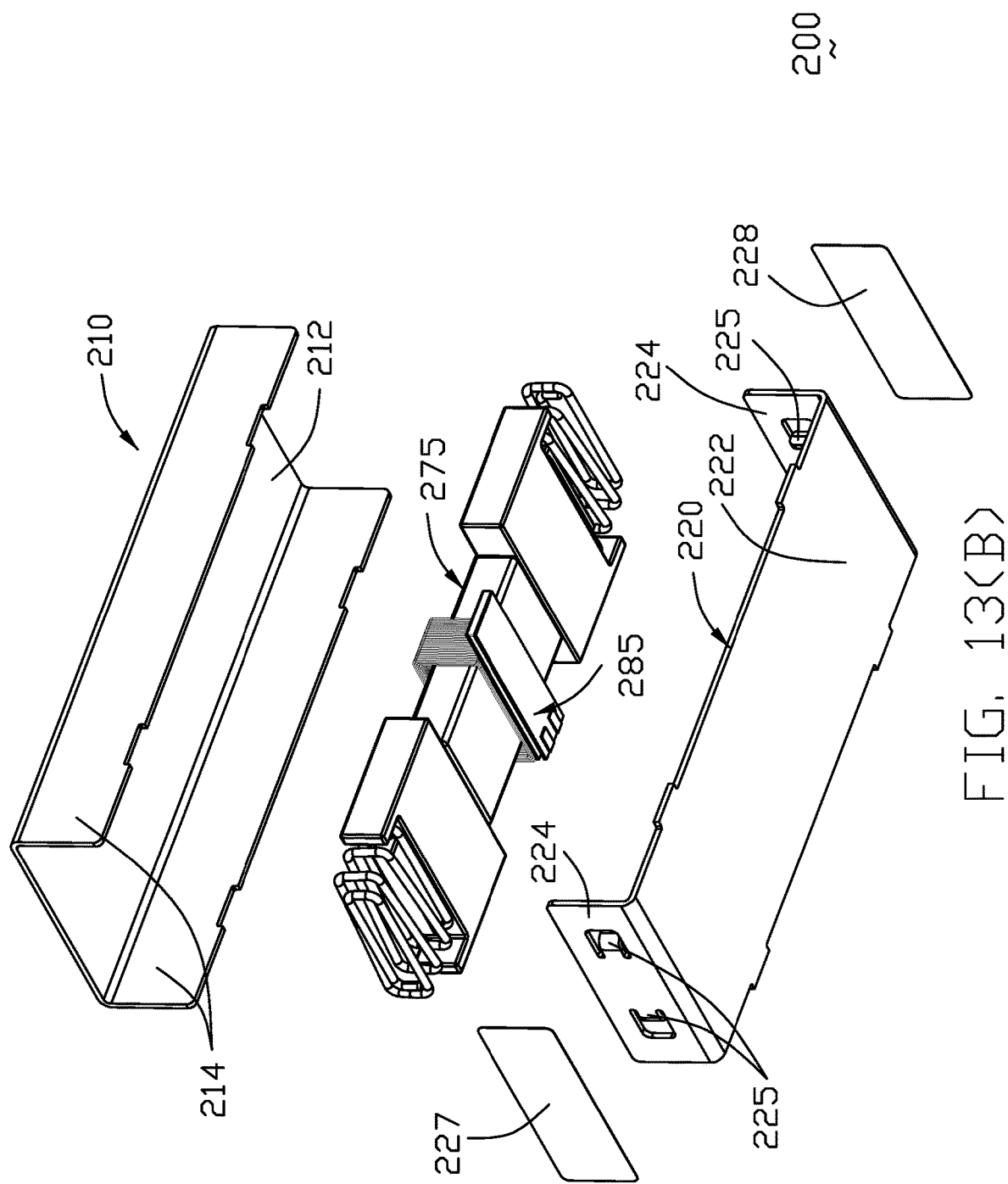
FIG. 13(B) is another exploded view of the electrical assembly of FIG. 13(A)
Figure 14A:
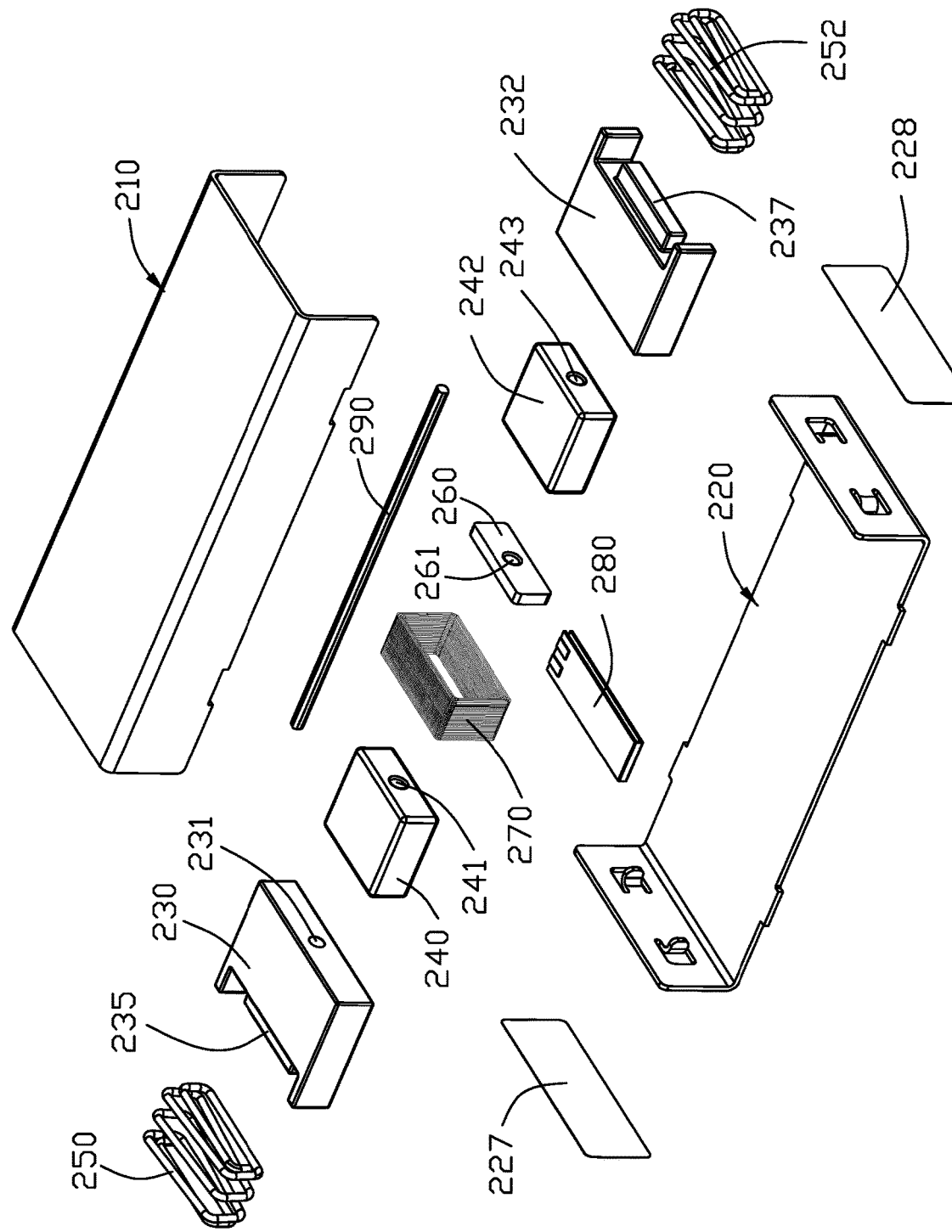
FIG. 14(A) is a further exploded perspective view of the LRA of FIG. 13(A)
Figure 14B:
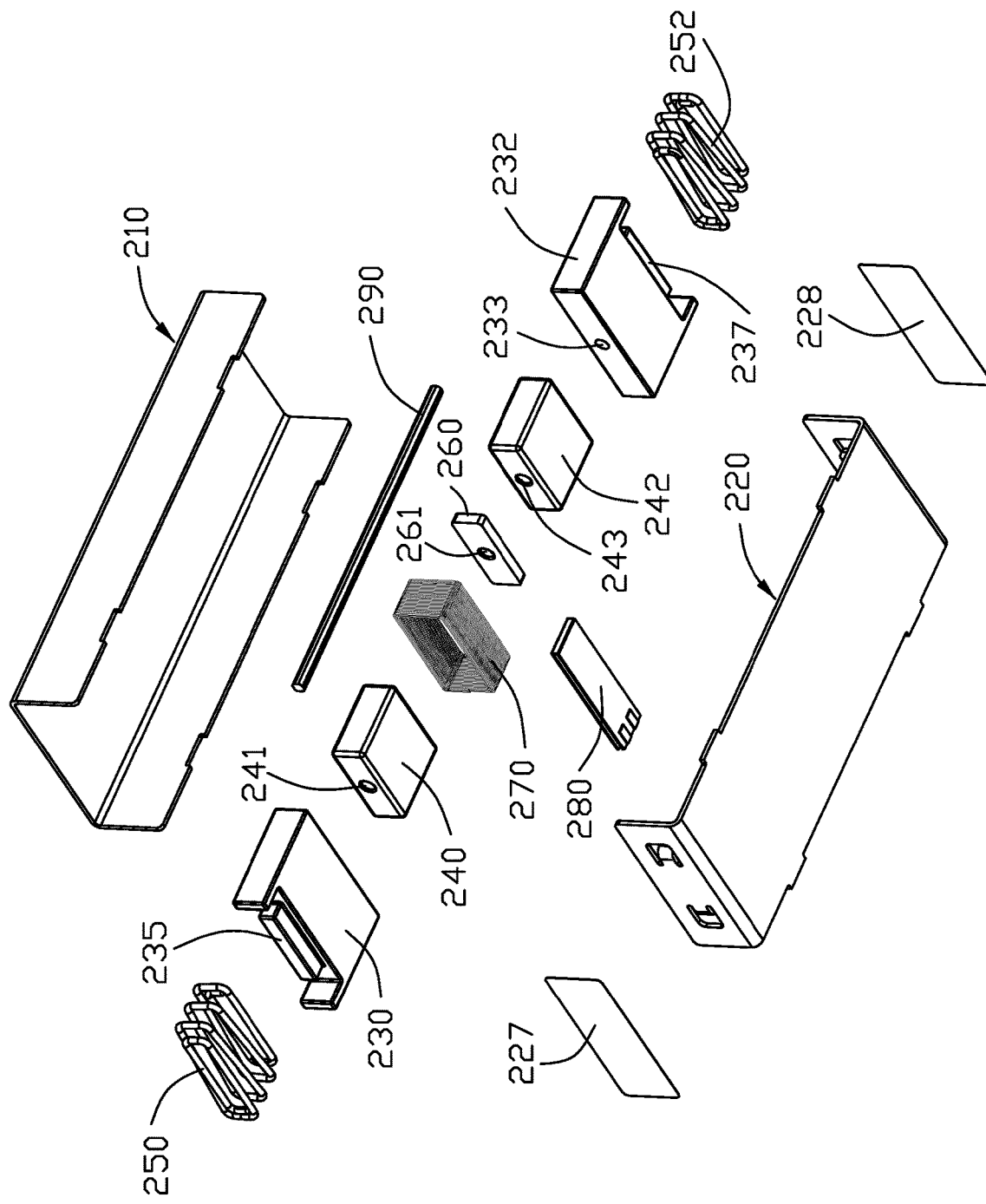
FIG. 14(B) is another exploded perspective view of the LRA of FIG. 14(A)
Figure 15:
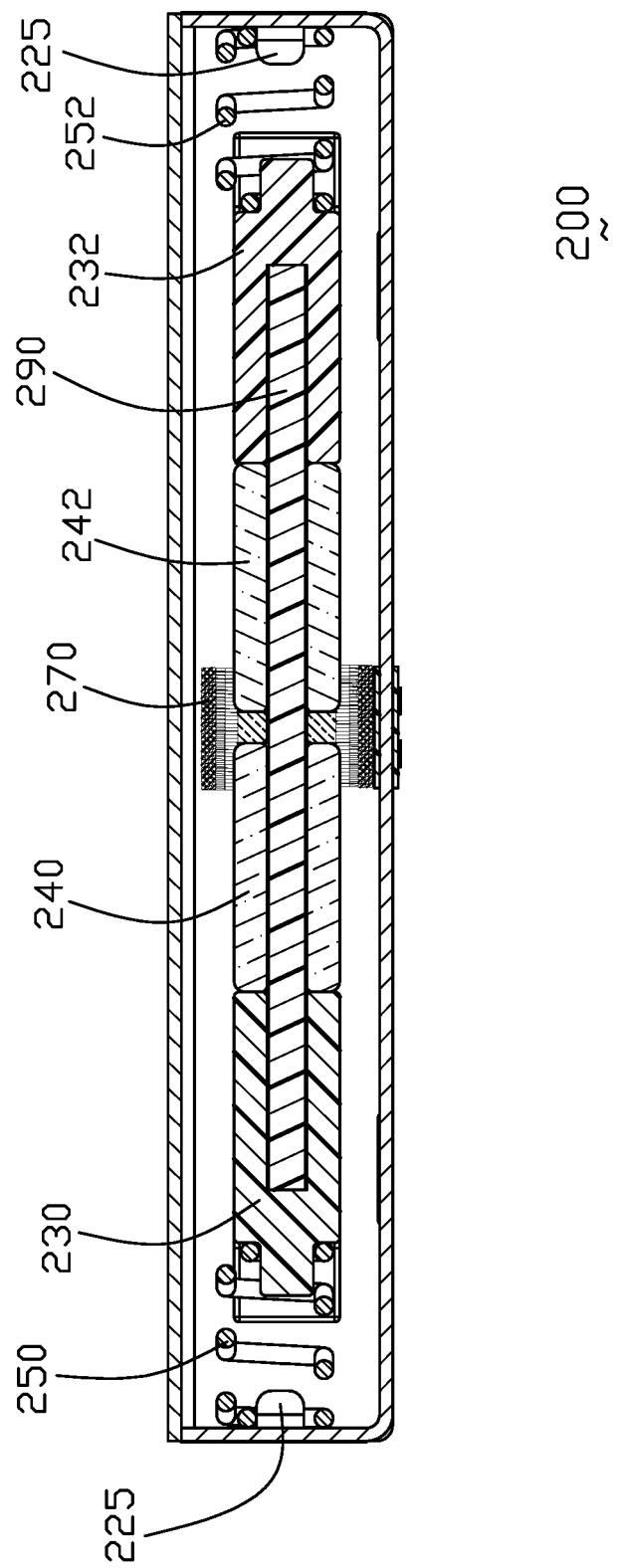
FIG. 15 is a cross-sectional view of the LRA of FIG. 12(A) along line 15-15 without showing the covers.
Figure 16:
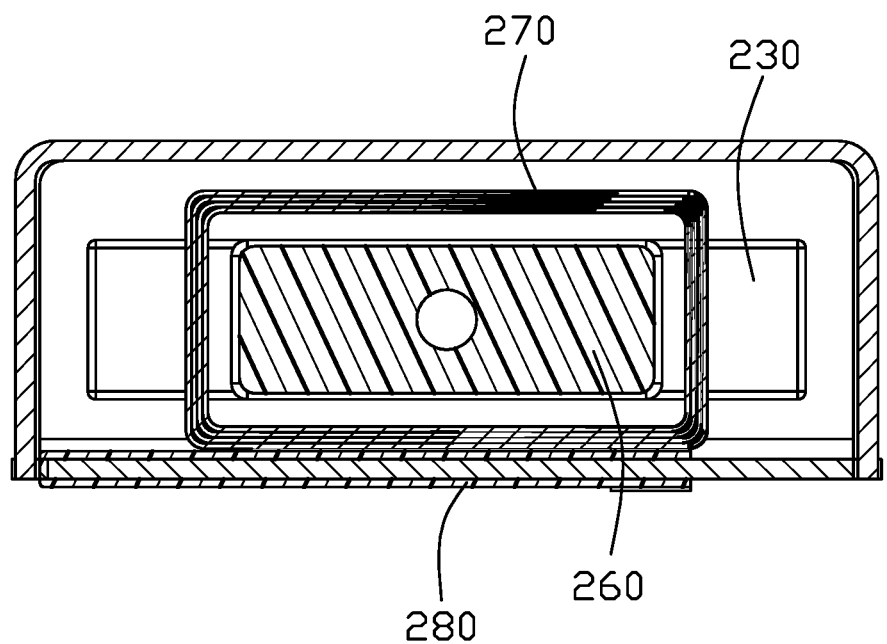
FIG. 16 is a cross-sectional view of the LRA of FIG. 12(A) along line 16-16.

FIGS. 12(A)-16 show a third embodiment in which the center axle does not extend to reach the short side wall but terminate within the moving mass, compared with the first and second embodiments. The LRA 200 includes a metallic case composed of a first half 210 and a second half 220 secured together to commonly form an internal space. The first half 210 includes a horizontal plate 212 and a pair of long side walls 214 while the second half 220 includes another horizontal plate 222 and a pair of end or short side walls 224 wherein each short side wall 224 forms a pair/set of inwardly extending tabs 225 functioning as the spring holder to hold the springs 250, 252 illustrated later. A pair of covers 227, 228 are attached upon the corresponding short side walls 224 to cover the openings derived from the inwardly extending tabs 225.

Similar to the other two embodiments, a magnet assembly 285 includes a first magnet 240 and a second magnet 242 cooperatively sandwiching a middle magnetizer 260 therebetween along the longitudinal direction. The first magnet 240 has a through hole 241, the second magnet 242 has a through hole 243, and magnetizer 260 has a though hole 261. A first moving mass 230 and a second moving mass 232 cooperatively sandwich the magnet assembly 285 therebetween along the longitudinal direction. The first moving mass 230 has a round blind hole 231, and the second moving mass 232 has a blind round hole 233. A first rectangular spring 250 is mounted upon and a second rectangular spring 252 whereby the pair of moving masses 230, 232 associated with the magnet assembly 285 therebetween are commonly sandwiched between the pair of rectangular springs 250, 252 tensionally in the longitudinal direction.

A moveable center axle 290 having a square cross-section, extends through the corresponding through holes 241, 243, 261 of the magnet assembly 285 and terminates at the blind holes 231, 233 of the opposite first moving mass 230 and second moving mass 232. Similar to the other two embodiments, the moving mass 230 has the protrusion 235 to capture the rectangular spring 250, and the moving mass 232 has the protrusion 237 to capture the rectangular spring 252. A coil assembly 275 includes conductive coil 270 and an FPC 280 wherein the conductive coil 270 surrounds the magnet assembly 285 with gaps therebetween while the FPC extends outside of the case.

Understandably, when the coil assembly 275 is operated, the magnet assembly 285 along with the pair of moving masses 230, 232 will be oscillated between the pair of springs 250, 252, along the longitudinal direction, thus resulting in haptic vibration. Notably, in the other two embodiment such a haptic vibration is essentially performed only along the longitudinal direction. Differently, in the third embodiment, because two ends of the center axle 290 no longer secured to the stationary case but embedded within the moveable masses 230, 232 to have the combination of the magnet assembly 285 and the pair of moving masses 230, 232, the haptic vibration is performed further slightly in the vertical direction additionally in comparison with the two other embodiments.

Figure 17A:
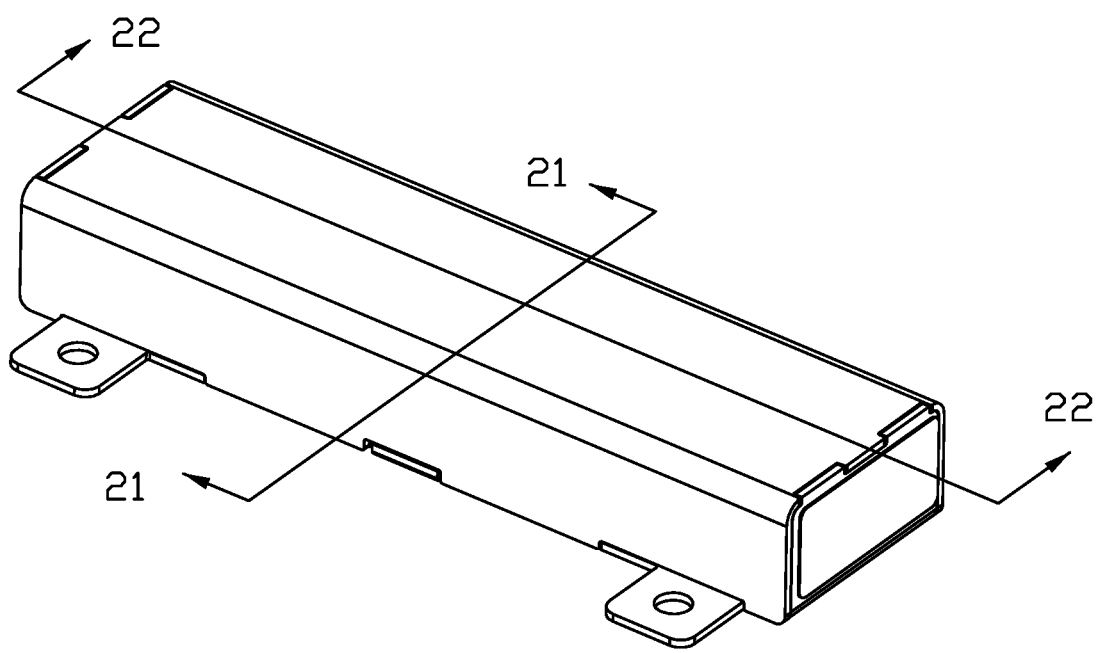
FIG. 17(A) is a perspective view of an LRA according to a fourth embodiment of the invention.
Figure 17B:
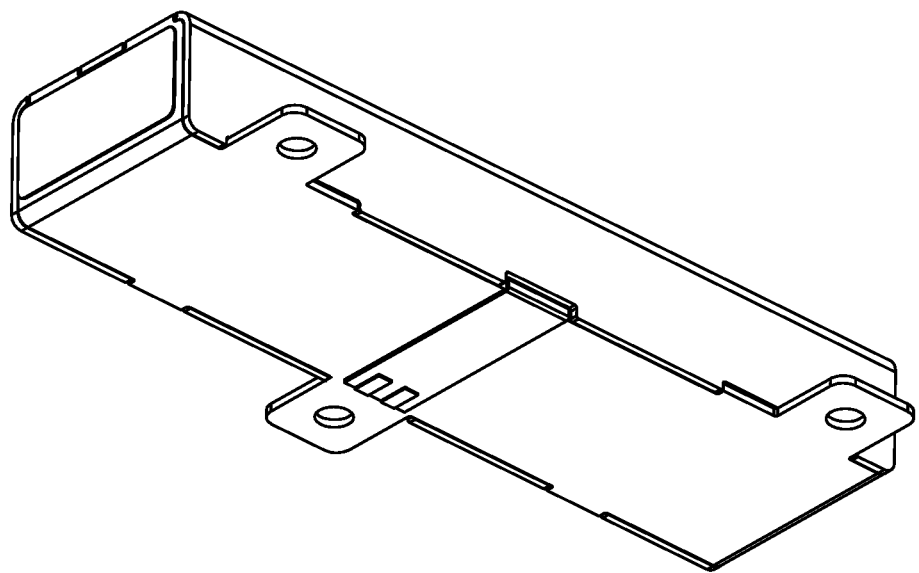
FIG. 17(B) is another perspective view of the LRA of FIG. 17(A)
Figure 18:
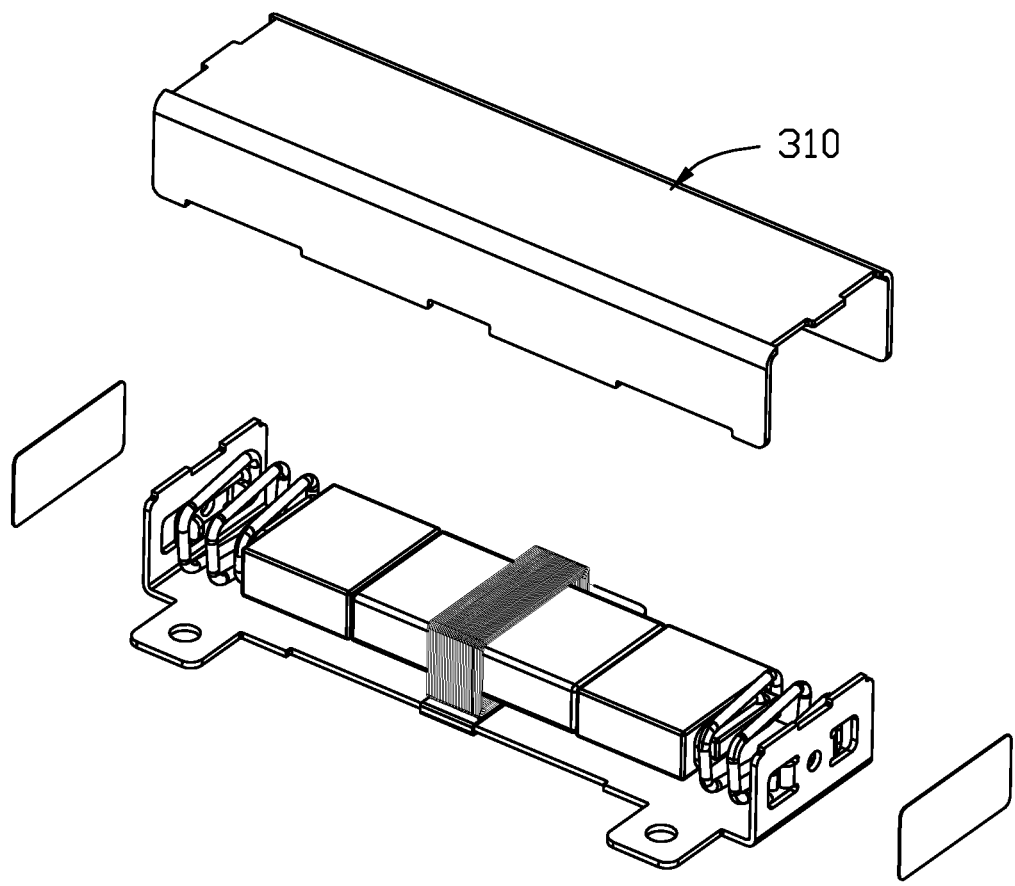
FIG. 18 is an exploded perspective view of the LRA of FIG. 17(A)
Figure 19A:
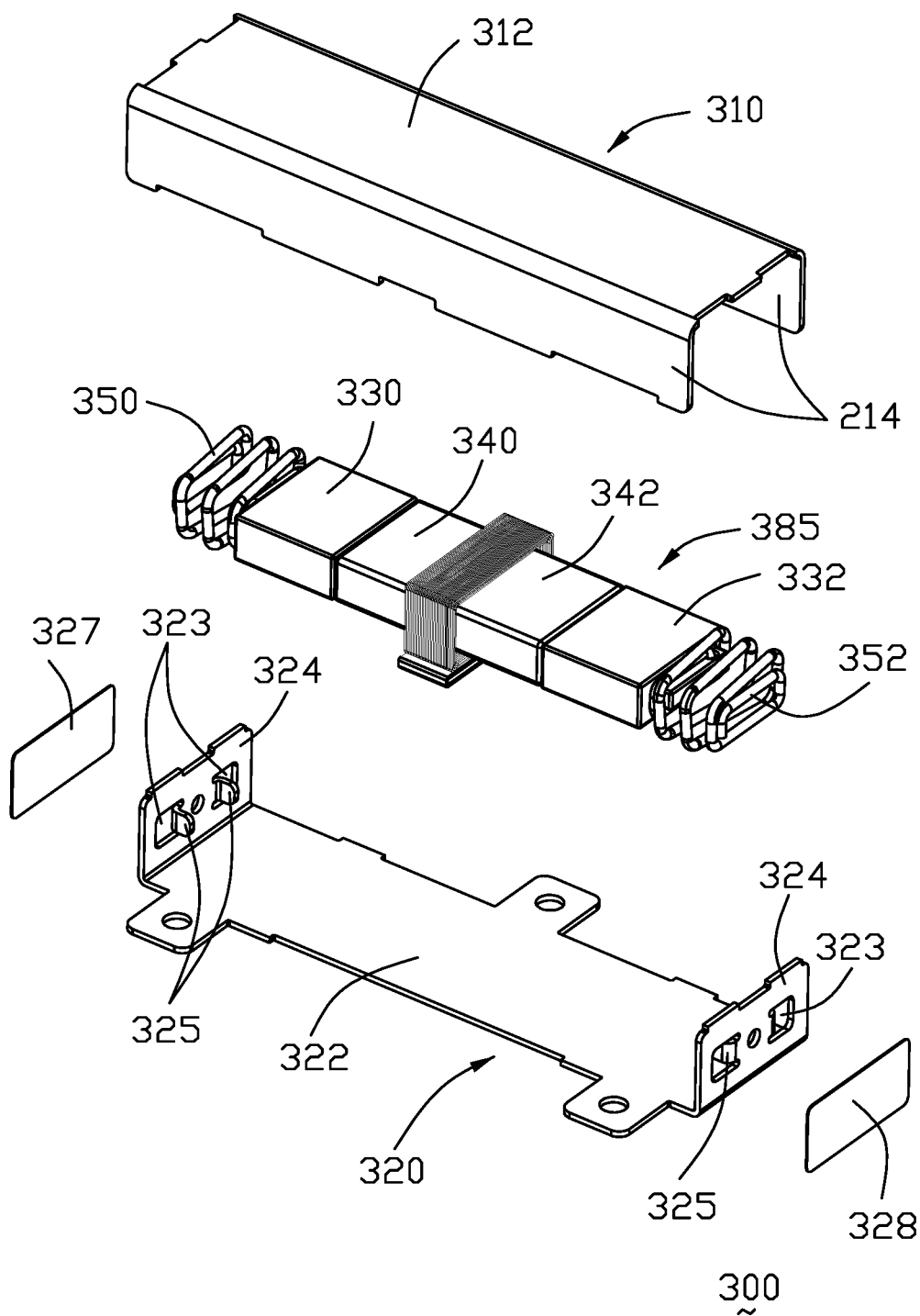
FIG. 19(A) is a further exploded perspective view of the LRA of FIG. 18.
Figure 19B:
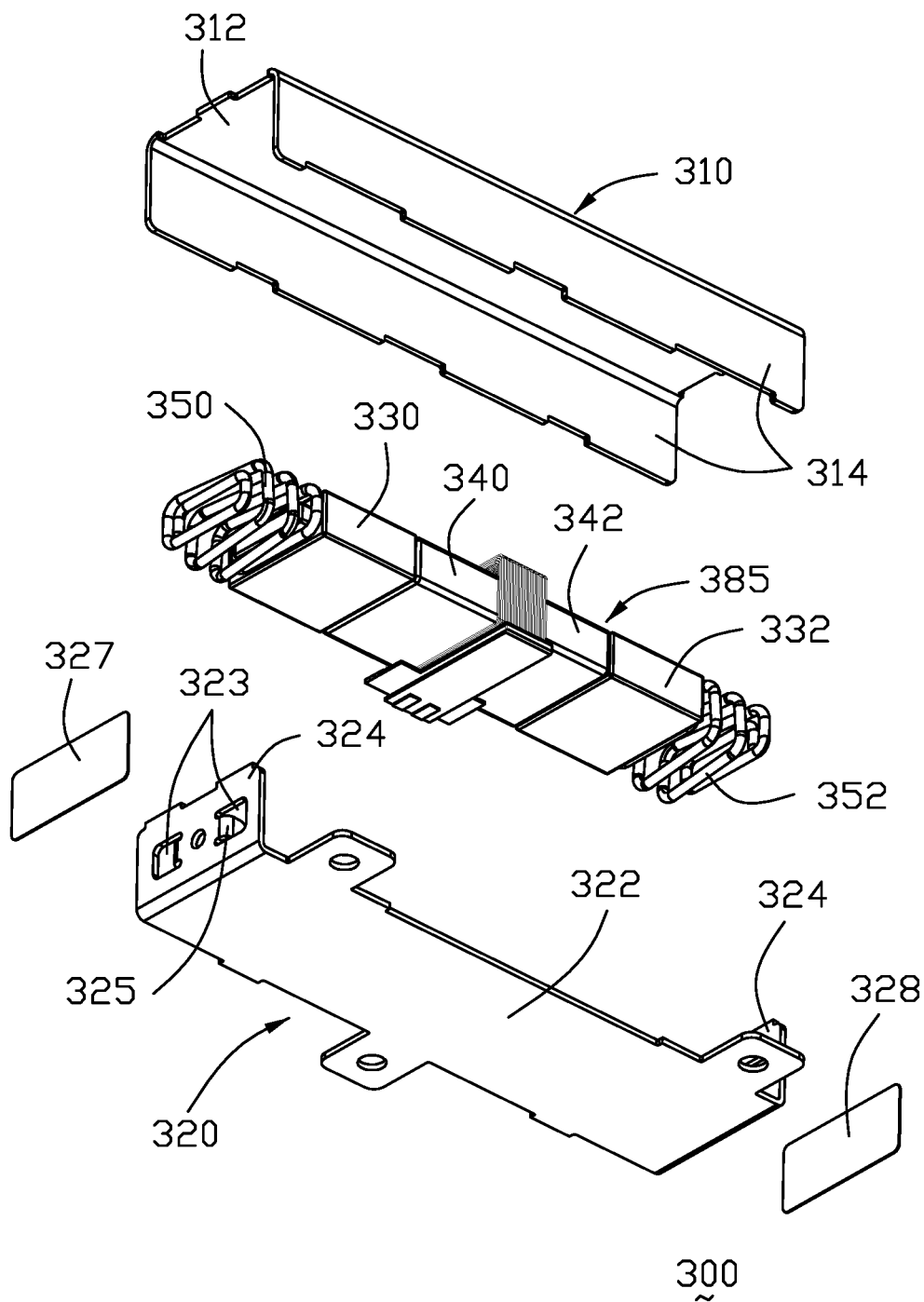
FIG. 19(B) is another exploded view of the LRA of FIG. 19(A)
Figure 20A:
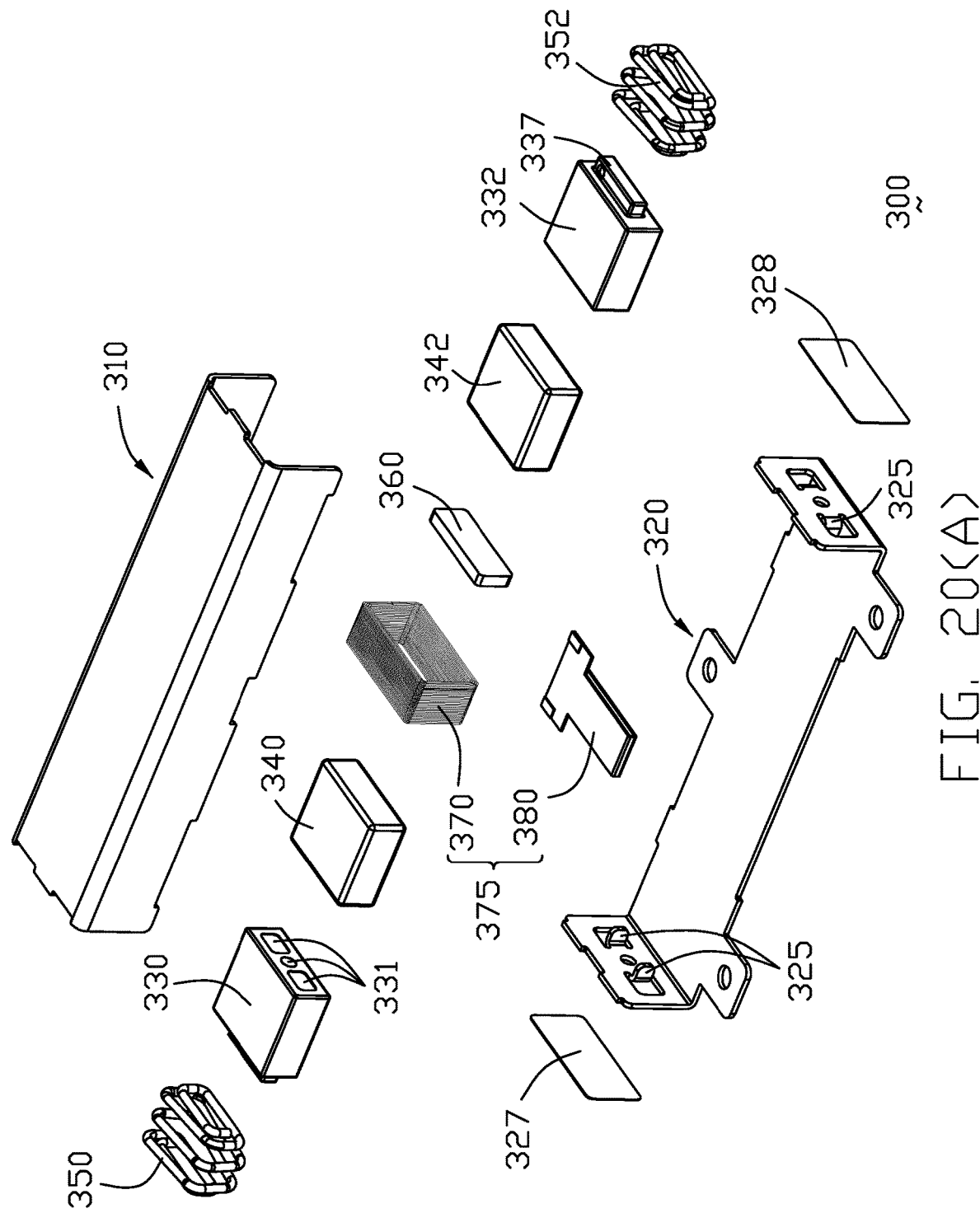
FIG. 20(A) is a further exploded perspective view of the LRA of FIG. 19(A)
Figure 20B:
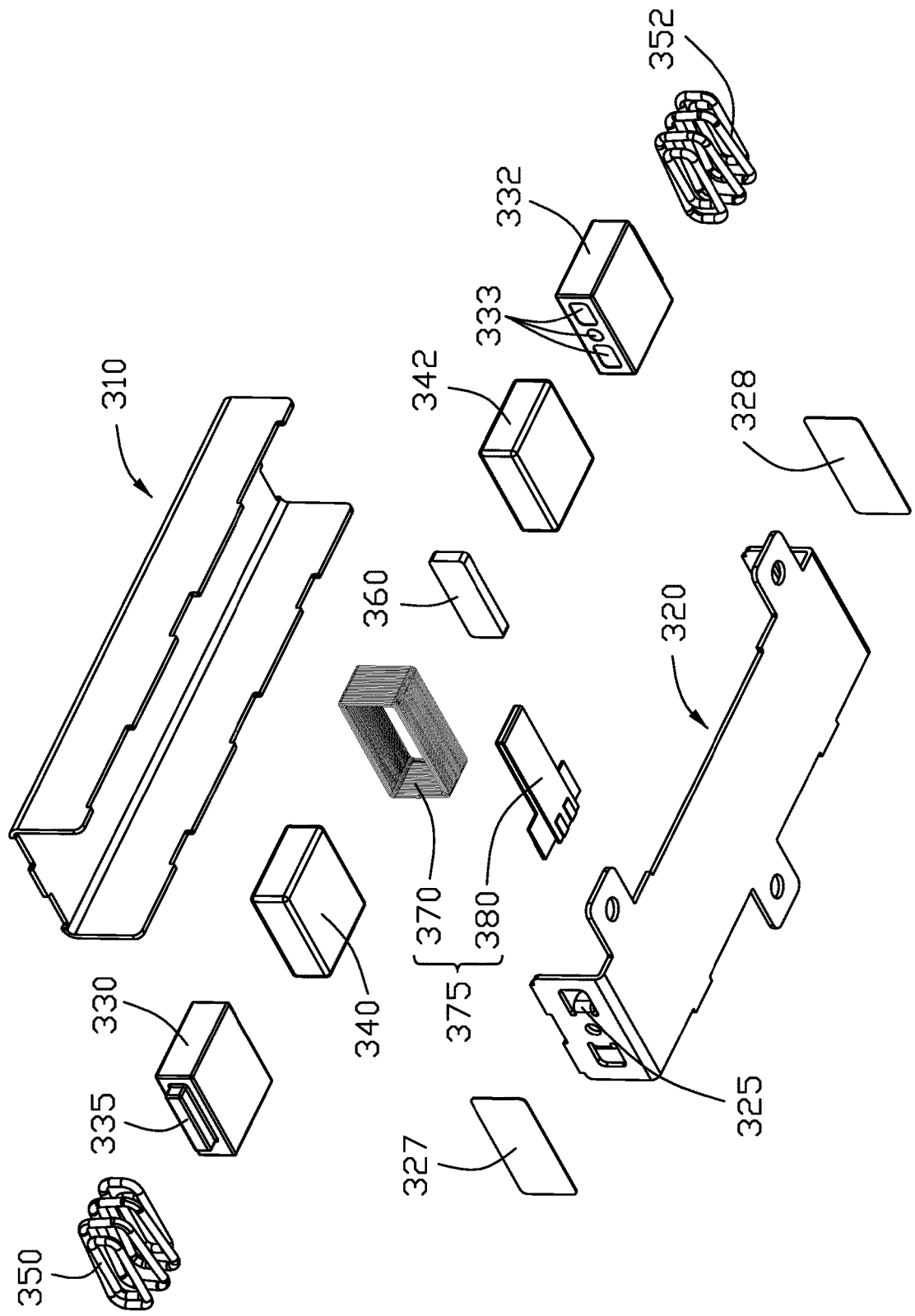
FIG. 20(B) is another exploded perspective view of the LRA of FIG. 20(A)
Figure 21:
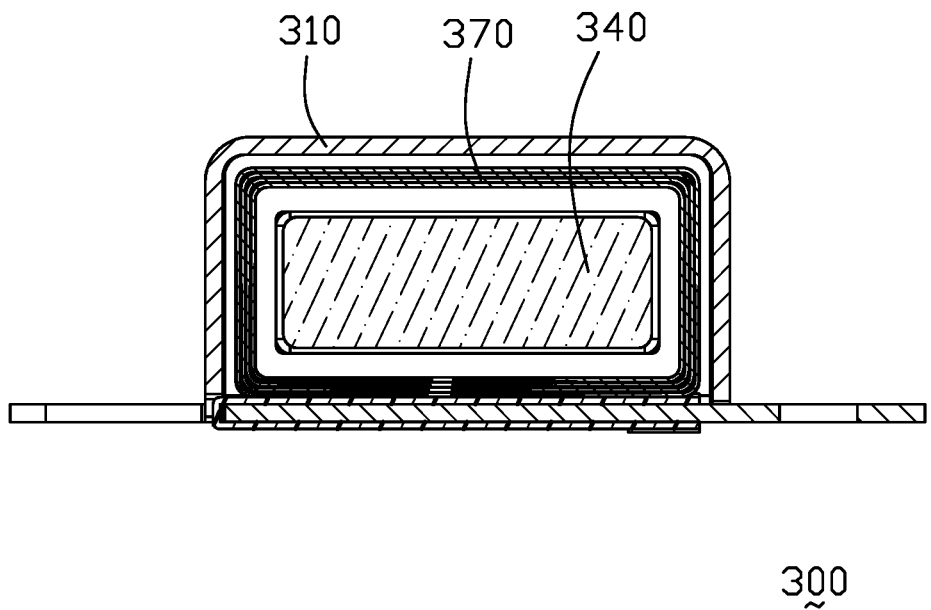
FIG. 21 is a transverse cross-sectional view of the LRA of FIG. 17(A)
Figure 22:
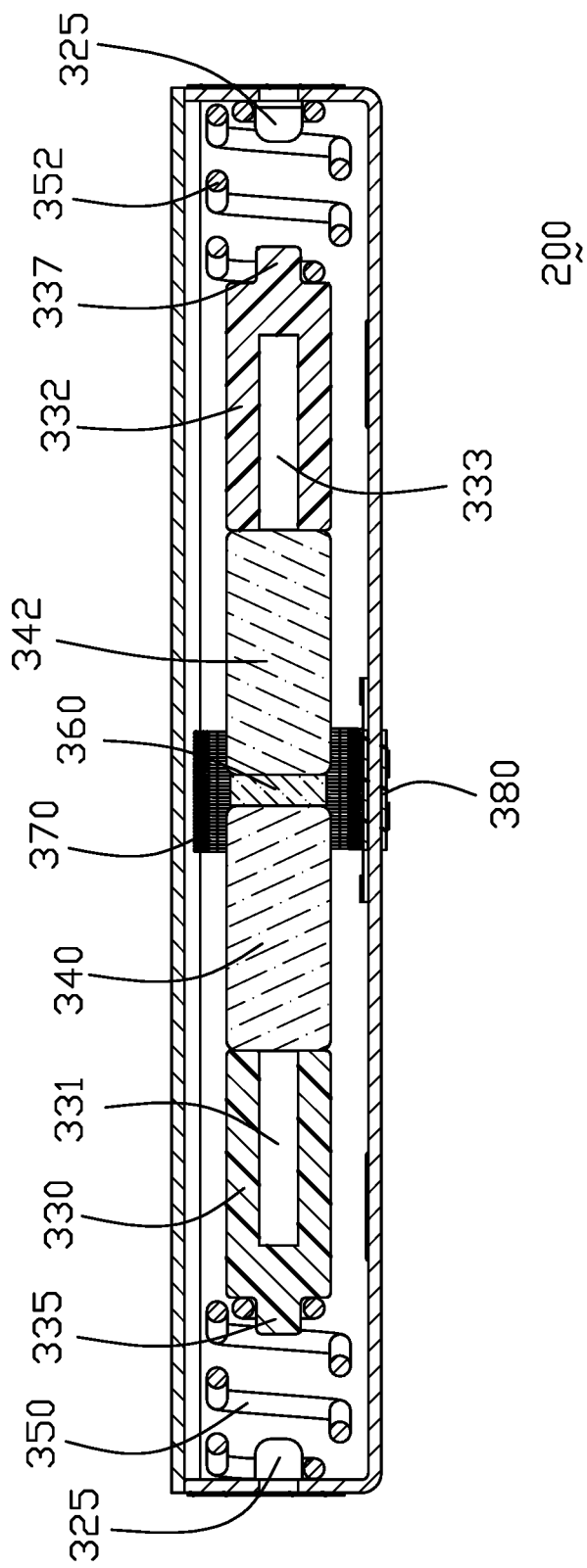
FIG. 22 is a longitudinal cross-sectional view of the LRA of FIG. 17(A).

Referring to FIGS. 17(A)-22, the LRA 300 includes a metallic case composed of a first half 310 and a second half 320 secured together to commonly form an internal space. The first half 310 includes a horizontal plate 312 and a pair of long side walls 314 while the second half 320 includes another horizontal plate 322 and a pair of end or short side walls 324 wherein each short side wall 324 forms a pair/set of inwardly extending tabs 325 functioning as the spring holder to hold the springs 350, 352 illustrated later. A pair of sheet covers 327, 328 are attached upon the corresponding short side walls 324 to cover the openings 323 derived from the inwardly extending tabs 325.

A magnet assembly 385 includes a first magnet 340 and a second magnet 342 cooperatively sandwiching a middle magnetizer 360 therebetween along the longitudinal direction. A first moving (weight) mass 330 and a second moving (weight) mass 332 cooperatively sandwich the magnet assembly 385 therebetween along the longitudinal direction. The first moving mass 330 has a set of blind holes 331, and the second moving mass 332 has a set of blind holes 333. A first rectangular spring 350 and a second rectangular spring 352 are mounted upon the tabs 325 whereby the pair of moving masses 330, 332 associated with the magnet assembly 385 therebetween are commonly sandwiched between the pair of rectangular springs 350, 352 tensionally in the longitudinal direction.

The moving mass 330 has the protrusion 335 to capture the rectangular spring 350, and the moving mass 332 has the protrusion 337 to capture the rectangular spring 352. The other end of the spring 350 is captured by the pair of tabs 325 as well as the other end of the spring 352. A coil assembly 375 includes conductive coil 370 and an FPC 380 wherein the conductive coil 370 surrounds the magnet assembly 385 with gaps therebetween while the FPC 380 extends outside of the case.

The interface between the first moving mass 330 and the first magnet 340 is filled with glue as well as that between the second moving mass 332 and the second magnet 342. The blind holes 331 of the first moving mass 330 are to receive the excessive glue as well as the blind hole 333 of the second moving mass 332. Alternately, an interengaging structure like the interface structure between the moving mass and the spring or the protrusion vs. recess structure, may be applied to the interface between the moving mass and the magnet as long as no radial relative movement therebetween. The interface between the magnetizer 360 and the corresponding magnet 340 or 342 is also applicable as well, if necessary.

Compared with the previous design, there is no shaft extending through the corresponding magnet assembly and the moving masses so as to ease the manufacturization of the magnet and the moving mass for no consideration of the precise dimension of the holes therein, which requires to comply with the diameter of the shaft. In contrast, in the instant invention the magnet requires no hole and the moving mass requires the holes without necessity of high precision.

What is claimed is:

1. A shaftless linear resonant actuator comprising:
   a metallic case forming an internal space therein;
   a magnet assembly disposed in the internal space;
   a coil assembly having a coil retained inside the case and surrounding the magnet assembly;
   a pair of moving masses commonly sandwiching the magnet assembly therebetween in an axial direction;
   a pair of springs commonly sandwiching therebetween the pair of moving masses and the magnet assembly associated therewith in the axial direction; and
   first spring capture devices formed on the case to respectively retain corresponding outer ends of the springs, and second spring capture devices formed on the corresponding masses to respectively retain corresponding inner ends of the spring; wherein
   a securing interface is formed between the magnet assembly and the corresponding mass to assure no radial relative movement therebetween; and
   glue is applied to the interface between the magnet assembly and the corresponding mass and the masses form blind holes for receiving excessive glue on the interface.

2. The shaftless liner resonant actuator as claimed in claim 1, wherein the first spring capture device on the case includes a pair of tabs stamped out of the case.

3. The shaftless linear resonant actuator as claimed in claim 1, wherein the spring forms a rectangular cross-section.

4. The shaftless linear resonant actuator as claimed in claim 1, wherein the second spring capture device includes a protrusion.

5. The shaftless linear resonant actuator as claimed in claim 1, wherein the coil assembly further includes a flexible printed circuit extending out of the case.

6. The shaftless linear resonant actuator as claimed in claim 1, wherein the case includes an upper cover having a pair of long walls, and a lower cover having a pair of short walls.

7. The shaftless linear resonant actuator as claimed in claim 6, wherein each short wall forms a pair of tabs functioning as a spring capture device.

* * * * *